(12) United States Patent
He et al.

(10) Patent No.: US 11,399,190 B2
(45) Date of Patent: Jul. 26, 2022

(54) ENHANCED CHROMA CODING USING CROSS PLANE FILTERING

(71) Applicant: InterDigital Madison Patent Holdings, SAS

(72) Inventors: Yong He, San Diego, CA (US); Yuwen He, San Diego, CA (US); Yan Ye, San Diego, CA (US); Xiaoyu Xiu, San Diego, CA (US)

(73) Assignee: InterDigital Madison Patent Holdings, SAS, Paris (FR)

( * ) Notice: Subject to any disclaimer, the term of this patent is extended or adjusted under 35 U.S.C. 154(b) by 0 days.

(21) Appl. No.: 15/742,836

(22) PCT Filed: Jul. 8, 2016

(86) PCT No.: PCT/US2016/041445
§ 371 (c)(1),
(2) Date: Jan. 8, 2018

(87) PCT Pub. No.: WO2017/007989
PCT Pub. Date: Jan. 12, 2017

(65) Prior Publication Data
US 2018/0220138 A1    Aug. 2, 2018

Related U.S. Application Data

(60) Provisional application No. 62/190,008, filed on Jul. 8, 2015.

(51) Int. Cl.
*H04N 19/186*    (2014.01)
*H04N 19/176*    (2014.01)
(Continued)

(52) U.S. Cl.
CPC ......... *H04N 19/186* (2014.11); *H04N 19/117* (2014.11); *H04N 19/136* (2014.11);
(Continued)

(58) Field of Classification Search
CPC .... H04N 19/117; H04N 19/186; H04N 19/86; H04N 19/176; H04N 19/80; H04N 19/82
(Continued)

(56) References Cited

U.S. PATENT DOCUMENTS 4,701,783 A   10/1987 Glenn et al.
9,344,715 B2   5/2016 Liu
(Continued)

FOREIGN PATENT DOCUMENTS

AU    2009266719 A1   1/2010
CN    101009842 A    8/2007
(Continued)

OTHER PUBLICATIONS

Baylon et al., "Response to Call for Evidence for HDR and WCG Video Coding: Arris, Dolby and InterDigital", Arris Inc., Dolby Laboratories Inc. and Inter Digital Communications, LLC, ISO/IEC JTC1/SC29/WG 11 MPEG2015/M36264, Warsaw, Poland, Jun. 2015, 9 pages.
(Continued)

*Primary Examiner* — Daniel Chang
(74) *Attorney, Agent, or Firm* — Condo Roccia Koptiw LLP

(57) ABSTRACT

Cross plane filtering may be used for enhanced chroma coding. An indication of a cross-plane filter associated with a current picture may be received. The current picture may include an intra-coded video block and a plurality of reference samples. The plurality of reference samples may be used to predict the intra-coded video block. A luma sample region may be determined in the current picture. The luma sample region may determined to enhance a corresponding chroma sample in the current picture. The cross-plane filter may be applied to a plurality of luma samples in the luma sample region to determine an offset. The cross-plane filter (Continued)

US 11,399,190 B2

Page 2 may be a high pass filter. The offset may be applied to the corresponding chroma sample to determine an enhanced chroma sample.

22 Claims, 19 Drawing Sheets

(51) Int. Cl.
　　　*H04N 19/117*　　　(2014.01)
　　　*H04N 19/80*　　　(2014.01)
　　　*H04N 19/467*　　　(2014.01)
　　　*H04N 19/182*　　　(2014.01)
　　　*H04N 19/136*　　　(2014.01)
　　　*H04N 19/159*　　　(2014.01)
(52) U.S. Cl.
　　　CPC ......... *H04N 19/159* (2014.11); *H04N 19/176* (2014.11); *H04N 19/182* (2014.11); *H04N 19/467* (2014.11); *H04N 19/80* (2014.11)
(58) Field of Classification Search
　　　USPC ............ 375/240.03, 240.12, 240.13, 240.16, 375/240.29
　　　See application file for complete search history.

(56) References Cited

U.S. PATENT DOCUMENTS

| | | | |
|---|---|---|---|
| 9,503,733 B2 | 11/2016 | Minoo et al. | |
| 9,641,866 B2 | 5/2017 | Chong et al. | |
| 9,930,611 B2 | 3/2018 | Qi et al. | |
| 2003/0184659 A1 | 10/2003 | Skow | |
| 2005/0013370 A1 | 1/2005 | Kim et al. | |
| 2005/0168650 A1 | 8/2005 | Walls et al. | |
| 2006/0268177 A1 | 11/2006 | Chang | |
| 2008/0019605 A1* | 1/2008 | Yea | G06T 5/50 382/261 |
| 2008/0043840 A1 | 2/2008 | Song | |
| 2009/0129465 A1 | 5/2009 | Lai et al. | |
| 2010/0086026 A1 | 4/2010 | Paniconi et al. | |
| 2011/0122308 A1* | 5/2011 | Duparre | H01L 27/14621 348/340 |
| 2011/0150080 A1* | 6/2011 | Watanabe | H04N 19/176 375/240.03 |
| 2011/0294523 A1 | 12/2011 | Ai et al. | |
| 2012/0008687 A1 | 1/2012 | Haskell | |
| 2012/0328013 A1* | 12/2012 | Budagavi | H04N 19/59 375/240.12 |
| 2013/0114696 A1* | 5/2013 | Liu | H04N 19/103 375/240.03 |
| 2014/0086316 A1 | 3/2014 | Kerofsky et al. | |
| 2014/0092999 A1* | 4/2014 | Dong | H04N 19/70 375/240.29 |
| 2014/0185680 A1* | 7/2014 | Li | H04N 19/59 375/240.16 |
| 2014/0192891 A1 | 7/2014 | Alshina et al. | |
| 2014/0314142 A1* | 10/2014 | Oh | H04N 19/82 375/240.02 |
| 2014/0369426 A1* | 12/2014 | Li | H04N 19/186 375/240.29 |
| 2015/0003524 A1* | 1/2015 | Yamamoto | H04N 19/176 375/240.12 |
| 2015/0015783 A1* | 1/2015 | Bernard | H04N 11/002 348/453 |
| 2015/0036744 A1 | 2/2015 | Sato | |
| 2015/0110174 A1* | 4/2015 | Gu | H04N 19/157 375/240.03 |
| 2015/0178892 A1* | 6/2015 | Alshina | G06T 3/4007 382/300 |
| 2015/0195566 A1* | 7/2015 | Hinz | H04N 19/105 375/240.13 |
| 2015/0281687 A1* | 10/2015 | Yasugi | H04N 19/103 382/166 |
| 2015/0373330 A1* | 12/2015 | Jeong | H04N 19/176 375/240.03 |
| 2019/0030967 A1 | 1/2019 | Araki | |

FOREIGN PATENT DOCUMENTS

| | | |
|---|---|---|
| CN | 101902653 A | 12/2010 |
| CN | 201726499 U | 1/2011 |
| CN | 104247422 A | 12/2014 |
| EP | 1509045 A2 | 2/2005 |
| JP | 2014-524708 A | 9/2014 |
| JP | 2017-134656 A | 8/2017 |
| JP | 6671321 B2 | 3/2020 |
| KR | 10-2010-0038164 A | 4/2010 |
| KR | 10-2013-0002284 A | 1/2013 |
| WO | WO 2006/108654 A2 | 10/2006 |
| WO | WO 2008/020687 A1 | 2/2008 |
| WO | WO 2010/001999 A1 | 1/2010 |
| WO | 2011/033643 A1 | 3/2011 |
| WO | WO 2013/164922 A1 | 11/2013 |
| WO | WO-2014115283 A1 * | 7/2014 ........... H04N 19/103 |
| WO | 2015/003753 A1 | 1/2015 |
| WO | 2015/062098 A1 | 5/2015 |

OTHER PUBLICATIONS

Boyce et al., "Draft High Efficiency Video Coding (HEVC) Version 2, Combined Format Range Extensions (RExt), Scalability (SHVC), and Multi-View (MV-HEVC) Extensions", Document No. JCTVC-R1013_v1, Joint Collaborative Team on Video Coding (JCT-VC) of ITU-T SG 16 WP 3 and ISO/IEC JTC 1/SC 29/WG 11, 18th Meeting: Sapporo, JP, Jun. 30-Jul. 9, 2014, 382 pages.

Chen et al., "Chroma Intra Prediction by Reconstructed Luma Samples", Document No. JCTVC-C206, Samsung Electronics Co., Ltd., Joint Collaborative Team on Video Coding (JCT-VC) of ITU-T SG16 WP3 and ISO/IEC JTC1/SC29/WG11, 3rd Meeting: Guangzhou, CN, Oct. 7-15, 2010, pp. 1-7.

Dong et al., "Chroma Enhancement for ILR Picture", Document No. JCTVC-L0059, InterDigital Communications, LLC, Joint Collaborative Team on Video Coding (JCT-VC) of ITU-T SG 16 WP 3 and ISO/IEC JTC 1/SC 29/WG 11, 12th Meeting: Geneva, CH, Jan. 14-23, 2013, pp. 1-6.

Dong et al., "Cross-Plane Chroma Enhancement for SHVC Inter-Layer Prediction", IEEE, Picture Coding Symposium (PCS), Dec. 2013, pp. 309-312.

Dong et al., "SCE4: Results of Test 4.2.4 on Chroma Enhancement for Inter Layer Prediction", Document No. JCTVC-M0183_r2, InterDigital Communications, Inc., Joint Collaborative Team on Video Coding (JCT-VC) of ITU-T SG 16 WP 3 and ISO/IEC JTC 1/SC 29/WG 11, 13th Meeting: Incheon, KR, Apr. 18-26, 2013, pp. 1-18.

Dong et al., "SEI Message: Post Filters to Enhance the Chroma Planes", Document No. JCTVC-N0224 R1, InterDigital Communications, Inc., Joint Collaborative Team on Video Coding (JCT-VC) of ITU-T SG 16 WP 3 ISO/IEC JTC 1/SC 29/WG 11, 14th Meeting: Vienna. AT, Jul. 25-Aug. 2, 2013, pp. 1-9.

ISO/IEC, "Information Technology—Generic Coding of Moving Pictures and Associated Audio Information: Video", ISO/IEC 13818-2, Dec. 2000, 220 pages.

ISO/IEC, "Information Technology—Coding of Moving Pictures and Associated Audio for Digital Storage Media at up to About 1,5 Mbit/s—Part 2: Video", Ref. No. ISO/IEC 11172-2:1993/Cor. 3:2003(E), Nov. 1, 2003, 6 pages.

ITU, "Codec For Audiovisual Services AT n*384 kbit/s", Series H: Audiovisual and Multimedia Systems, Coding of Moving Video, International Telecommunication Union, ITU-T Rec H.261, Nov. 1988, 14 pages.

ITU-T, "Video Coding for Low Bit Rate Communication", H.263, Series H: Audiovisual And Multimedia Systems, Infrastructure of Audiovisual Services—Coding of Moving Video, Jan. 2005, 226 pages.

(56) References Cited

OTHER PUBLICATIONS

ITUT-T, "Advanced Video Coding for Generic Audiovisual Services", Series H: Audiovisual And Multimedia Systems, Infrastructure of Audiovisual Services—Coding of Moving Video, ITU-T Rec H.264 and ISO/IEC/MPEG 4 Part 10, Nov. 2007, 563 pages.
Lainema et al., "Intra Coding of the HEVC Standard", IEEE Transactions On Circuits And Systems For Video Technology, vol. 22, No. 12, Dec. 2012, pp. 1792-1801.
McCann et al., "High Efficiency Video Coding (HEVC) Test Model 16 (HM 16) Improved Encoder Description", Document No. JCTVC-S1002, Joint Collaborative Team on Video Coding (JCT-VC) of ITU-T SG16 WP3 and ISO/IEC JTC1/SC29/WG11, 19th Meeting: Strasbourg, FR, Oct. 17-24, 2014, 54 pages.
Yin et al., "Candidate Test Model for HDR extension of HEVC", Dolby Laboratories Inc. and InterDigital Communications, LLC, ISO/IEC JTC1/SC29/WG11 MPEG2014/ m37269, Geneva, CH, Oct. 2015, 6 pages.
Cho et al., "Color Transient Improvement with Transient Detection and Variable Length Nonlinear Filtering", IEEE Transactions on Consumer Electronics, vol. 54, No. 4, Nov. 2008, pp. 1873-1879.
Dong et al., "Chroma Enhancement for ILR Picture", InterDigital Communications, LLC, JCTVC-L0059, Joint Collaborative Team on Video Coding (JCT-VC) of ITU-T SG 16 WP 3 and ISO/IEC JTC 1/SC29/WG 11, 12th Meeting: Geneva, CH, Jan. 14-23, 2013, pp. 1-6.
Kim et al., "New Intra Chroma Prediction Using Inter-Channel Correlation", JCTVC-B021, Joint Collaborative Team on Video Coding (JCT-VC) of ITU-T SG16 WP3 and ISO/IEC JTC/SC29/WG11, 2nd Meeting, Geneva, CH, Jul. 21-28, 2010, 9 pages.
Lee et al., "Intra Prediction Method Based on the Linear Relationship Between the Channels for YUV 4:2:0 Intra Coding", 16th IEEE International Conference on Image Processing (ICIP), Nov. 7-10, 2009, 4 pages.
Li et al., "Non-SCE3: Region Based Inter-Layer Cross-Color Filtering", Qualcomm Incorporated, Samsung Electronics, Ltd., JCTVC-N0229, Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, pp. 1-12.
Bross et al., "High efficiency video coding (HEVC) text specification draft 8", JCTVC-J1003, 10th Meeting: Stockholm, SE, Jul. 11-20, 2012, 294 pages.
ISO/IEC, "Joint Call for Proposals on Scalable Video Coding Extensions of High Efficiency Video Coding (HEVC)", ISO/IEC JTC 1/SC 29/WG 11 and ITU-T SG 16 WP 3, ISO/IEC JTC1/SC29/WG11 N12957, Stockholm, Sweden, Jul. 2012, 11 pages.
ITU-R, "Studio Encoding Parameters of Digital Television for Standard 4:3 and Wide-Screen 16:9 Aspect Ratios", Recommendation ITU-R BT.601-5, Section 11B: Digital Television, 1998, pp. 1-16.
ITU-T, "Advanced Video Coding for Generic Audiovisual Services", ITU-T Recommendation H.264, Nov. 2007, 563 pages.
Tourapis, et al., "H.264/14496-10 AVC reference Software Manual", JM reference software JM16.1, Document Available at: http://iphome.hhi.de/suehring/tml/download/jm16.1.zip, Sep. 2009.
Luthra, "Requirements of the Scalable Enhancement of HEVC", WG11 Requirements and Video, N12956, Stockholm, Sweden, Jul. 2012, 12 pages.
Luthra, Ajay, "Use Cases for the Scalable Enhancement of HEVC", ISO/IEC JTC-1/SC29/WG11 M24483, Apr. 2012.
SMPTE, "VC-1 Compressed Video Bitstream Format and Decoding Process-Amendment 2", Amendment: Feb. 2011 to SMPTE ST 421M:2006, Apr. 2006, pp. 1-5.
Sullivan et al., "Rate-Distortion Optimization for Video Compression", Signal Processing Magazine, IEEE, vol. 15, No. 6, Nov. 1998, pp. 74-90.
Li, Xiang et al., "Non-SCE4: Simplification of chroma enhancement for inter layer reference picture generation", Joint Collaborative Team on Video Coding (JCT-VC) of ITU-T SG 16 WP 3 and ISO/IEC JTC 1/SC 29/WG 11, JCTVC-M0253, Apr. 18-26, 2013, 4 pages.
Dong et al., "Non-RCE1: In-loop Chroma Enhancement for HEVC Range Extensions", JCTVC-N0223_R1, InterDigital Communications, Inc., Joint Collaborative Team on Video Coding (JCT-VC) of ITU-T SG 16 WP 3 and ISO/IEC JTC 1/SC 29/WG 11, 14th Meeting: Vienna, AT, Jul. 25-Aug. 2, 2013, pp. 1-6.
3rd Generation Partnership Project (3GPP), S2-153211, "Dedicated Core Network (DCN) Selection based on UE's Indication to RAN", NEC, SA WG2 Meeting #111, Chengdu, P. R. China, Oct. 19-23, 2015, pp. 1-3.
3rd Generation Partnership Project (3GPP), S2-153307, "Solution for Enhanced Dedicated Core Network Selection", Huawei, HiSilicon, SA WG2 Meeting #111, Chengdu, China, Oct. 19-23, 2015, pp. 1-8.
Yeo et al., "Mode-Dependent Fast Separable KLT for Block-based Intra Coding", JCTVC-B024, Institute for Infocomm Research, Joint Collaborative Team on Video Coding (JCT-VC) of ITU-T SG16 WP3 and ISO/IEC JTC1/SC29/WG11, 2nd Meeting: Geneva, CH, Jul. 21-28, 2010, pp. 1-7.
Danielyan et al., "Cross-Color BM3D Filtering of Noisy Raw Data", IEEE 2009 International Workshop on Local and Non-Local Approximation in Image Processing, Aug. 19-21, 2009, pp. 125-129.

\* cited by examiner

FIG. 3
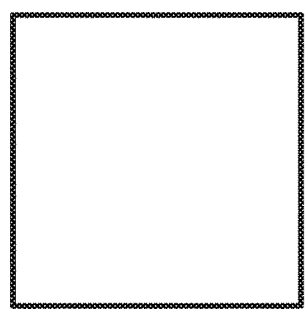
PART_2Nx2N
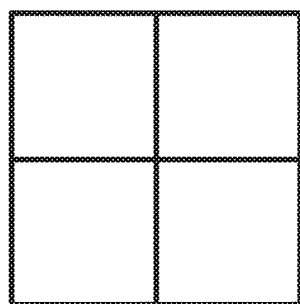
PART_NxN
FIG. 4

ENHANCED CHROMA CODING USING CROSS PLANE FILTERING

CROSS-REFERENCE TO RELATED APPLICATIONS

This application is the National Stage Entry under 35 U.S.C. § 371 of Patent Cooperation Treaty Application No. PCT/US2016/041445, filed Jul. 8, 2016, which claims priority to U.S. provisional patent application no. 62/190,008, filed Jul. 8, 2015, which is incorporated herein by reference in its entirety.

BACKGROUND

Video coding systems may be used to compress digital video signals. For example, video coding systems may reduce storage space consumed and/or reduce transmission bandwidth consumption associated with video signals. For example, block-based hybrid video coding systems may be used.

Digital video signals may include three color planes. The three color planes may include a luma plane, a blue-difference chroma plane, and a red-difference chroma plane. Pixels of the chroma planes may have smaller dynamic ranges than pixels of the luma plane. For example, the chroma planes of a video image may be smoother and/or have less detail than the luma plane of the video image. A chroma block of a video image may be easier to predict (e.g., accurately predict). For example, prediction of the chroma block may consume fewer resources and/or result in less prediction error.

A high dynamic range (HDR) video may offer a wider dynamic range than a standard dynamic range (SDR) video. The dynamic range of HDR video may be closer to the capacities of the human eye. Chroma artifacts in HDR video may be more visible against a brighter background than chroma artifacts in SDR video. HDR video coding may include preprocessing, coding, decoding, and/or post-processing.

SUMMARY

Systems, methods, and instrumentalities are disclosed for enhanced chroma coding using cross plane filtering. An indication of a cross-plane filter associated with a current picture may be received. The indication may include one or more filter coefficients associated with the cross-plane filter. The current picture may include an intra-coded video block and a plurality of reference samples. The plurality of reference samples may be used to predict the intra-coded video block. A luma sample region may be determined in the current picture. The luma sample region may include a plurality of luma samples. For example, the luma sample region may be a 3×3 block of luma samples. The plurality of luma samples may include predicted luma samples such that the cross-plane filter is applied to the predicted luma samples prior to reconstruction of the luma samples. The plurality of luma samples may include reconstructed luma samples such that the cross-plane filter may be applied to the reconstructed luma samples after reconstruction. The luma sample region may be determined based on a selected intra prediction mode.

The luma sample region may be determined for enhancing a corresponding chroma sample in the current picture. The corresponding chroma sample may be a predicted chroma sample or a reconstructed chroma sample. When the corresponding chroma sample is a predicted chroma sample in the intra-coded video block, the enhanced chroma sample may be used for prediction. When the corresponding chroma sample is a reconstructed chroma sample before in-loop filtering, the enhanced chroma sample may be used to replace the corresponding chroma sample before in-loop filtering is applied. The corresponding chroma sample may be a reference chroma sample used to predict one or more chroma samples in the intra-coded video block. A determination of whether to apply the cross-plane filter based on a received chroma enhancement indicator. The received chroma enhancement indicator may be received at a block level. The cross-plane filter may be applied to a plurality of luma samples in the luma sample region to determine an offset. The cross-plane filter may be a high pass filter. The offset may be applied to the corresponding chroma sample to determine an enhanced chroma sample. The luma sample region may include an unavailable luma sample. The unavailable luma sample may be replaced with a neighboring available luma sample, for example, prior to applying the cross-plane filter to the plurality of luma samples. The cross-plane filter to apply may be determined based on the selected intra prediction mode.

A plurality of luma sample regions may be determined for a current picture. For example, a first luma sample region and a second luma sample region may be determined. The first luma sample region may include a first plurality of luma samples. The second luma sample region may include a second plurality of luma samples. The first luma sample region may neighbor a first corresponding chroma sample in the current picture. The second luma sample region may neighbor a second corresponding chroma sample in the current picture. The cross-plane filter may be applied to the first plurality of luma samples and the second plurality of luma samples to determine a first offset and a second offset, respectively. The first offset may be applied to the first corresponding chroma sample to determine a first enhanced chroma sample. The second offset may be applied to the second corresponding chroma sample to determine a second enhanced chroma sample.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 3 shows an example of reference samples $R_{x,y}$ used for prediction to obtain predicted samples $P_{x,y}$ for a block size of N×N samples.

FIG. 4 shows an example of partitioning modes for intra prediction unit.

DETAILED DESCRIPTION

A detailed description of illustrative embodiments will now be described with reference to the various figures. Although this description provides a detailed example of possible implementations, it should be noted that the details are intended to be exemplary and in no way limit the scope of the application.

Video coding systems may compress digital video signals, for example, to reduce the storage and/or transmission bandwidth of digital video signals. There are a variety of video coding systems, such as block-based, wavelet-based, object-based systems and block-based hybrid video coding systems. Examples of block-based video coding systems are H.261, (Moving Picture Experts Group) MPEG-1, MPEG-2, H.263, H.264/Advanced Video Coding (AVC) and H.265/ High Efficiency Video Coding (HEVC).

Figure 1:
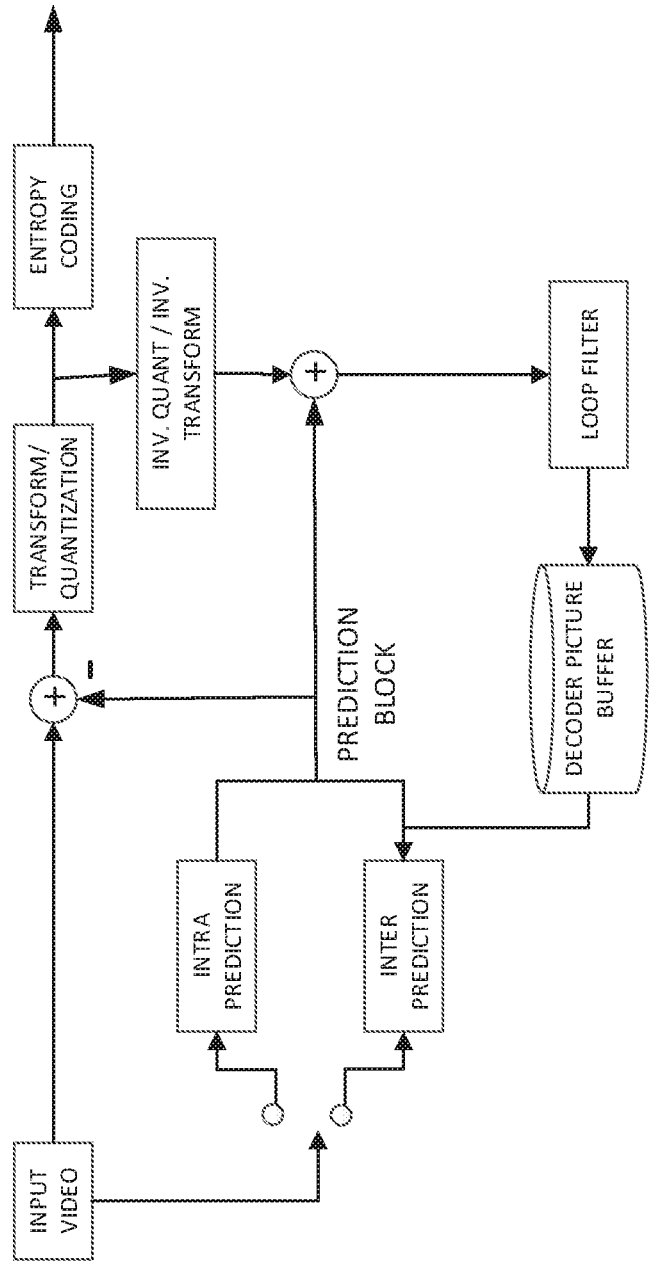
FIG. 1 shows an example of a block based hybrid video encoder.

FIG. 1 shows an example of a block based hybrid video encoder. Spatial prediction (e.g., intra prediction) or temporal prediction (e.g. inter prediction) may be performed, for example, for a (e.g., each) video block, e.g., to reduce spatial and temporal redundancy in video blocks. A prediction block generated from intra or inter prediction may be subtracted from a current video block. A resulting prediction residual may be transformed and quantized. A residual may be reconstructed, for example, by inverse quantizing and inverse transforming quantized residual coefficients. A reconstructed residual may be added to a prediction block, e.g., to form a reconstruction video block. In-loop filtering may be applied to a reconstructed video block. A filtered reconstructed video block, which may be stored in a decoded picture buffer, may be used to code one or more next video blocks.

Figure 2:
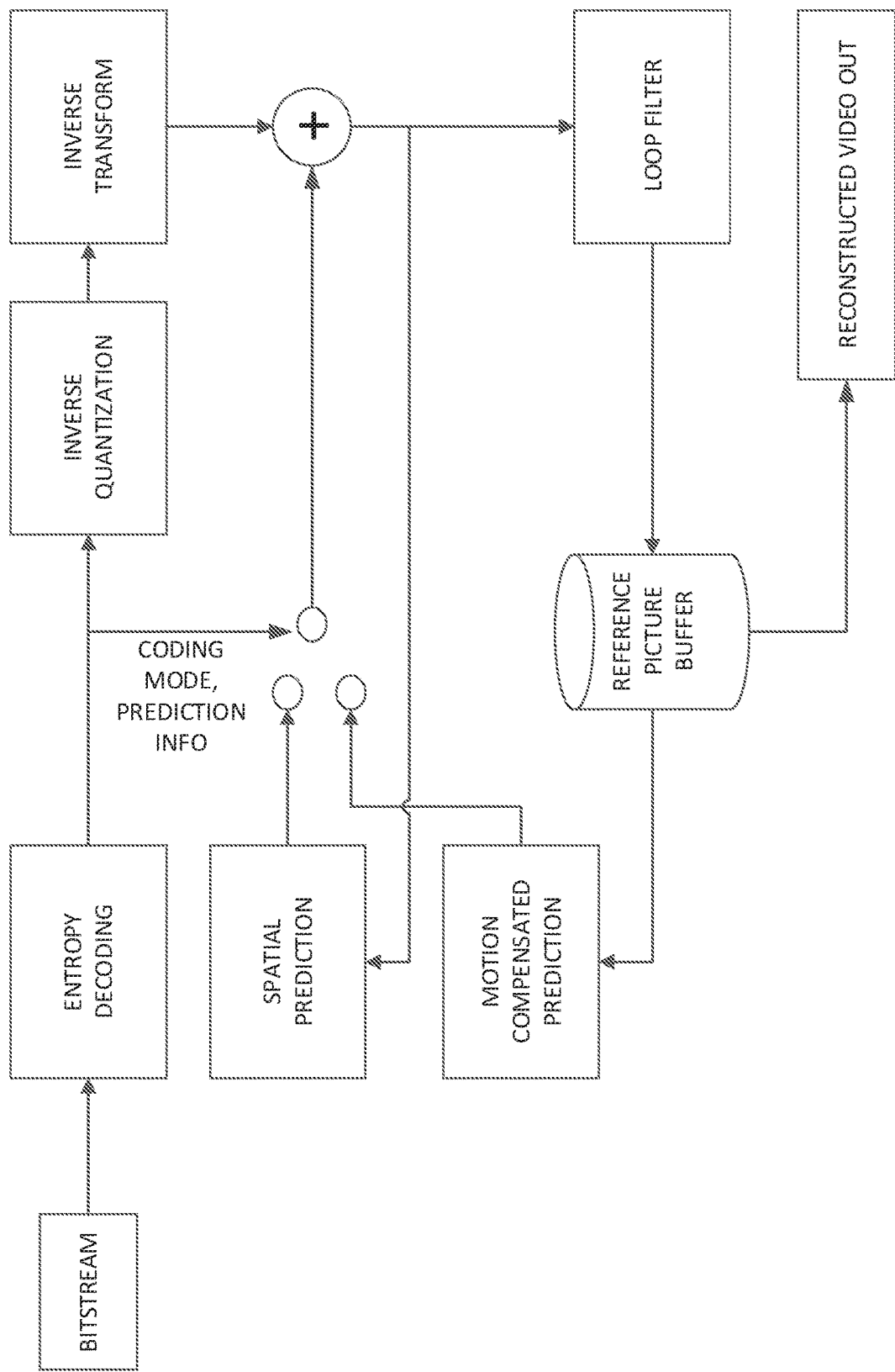
FIG. 2 shows an example of a block based hybrid video decoder.

FIG. 2 shows an example of a block based hybrid video decoder. The decoder in FIG. 2 may correspond to the encoder in FIG. 1. An encoded video bitstream may be parsed and entropy decoded. A coding mode and associated prediction information may be passed, for example, to spatial prediction or motion compensated prediction, e.g., to form a prediction block. Residual transform coefficients may be inverse quantized and inverse transformed, for example, to reconstruct a residual block. A prediction block and a reconstructed residual block may be added together, e.g., to form a reconstructed block. In-loop filtering may be applied to a reconstructed video block. A filtered reconstructed video block, which may be stored in a reference picture buffer, may be used to predict future video blocks.

Intra coding may be used, for example, to eliminate spatial correlation in some image and video coding techniques, such as Joint Photographic Experts Group (JPEG), H.261, MPEG-1, MPEG-2, H.263, H.264/AVC and H.265/ HEVC. Directional intra prediction may be used, for example, in H.264/AVC and H.265/HEVC, e.g., to improve coding efficiency. Intra prediction modes may utilize a set of reference samples, e.g., from above and to the left of a current block to be predicted. Reference samples may be denoted as $R_{x,y}$. In an example, a position (x, y) may have its origin one pixel above and to the left of a block's top-left corner. A predicted sample value at the position (x, y) may be denoted as $P_{x,y}$.

FIG. 3 shows an example of reference samples $R_{x,y}$ used for prediction to obtain predicted samples $P_{x,y}$ for a block size of N×N samples.

FIG. 4 shows an example of partitioning modes for an intra prediction unit (PU). HEVC intra coding may support multiple types of PU division, e.g., PART_xz2N×2N and PART_N×N, which may split a coding unit (CU) into one or four equal size PUs, respectively. PART_2N×2N may be available when a CU size is a configured minimum CU size.

An 8×8 CU split into four 4×4 PUs may have four luma prediction blocks (PBs), for example, for 4:2:0 chroma formats. There may be one 4×4 PB per chroma channel for intra coded blocks, for example, to avoid high throughput caused by 2×2 chroma intra prediction blocks.

A CU may be split into multiple transform units (TUs). Intra prediction may be applied sequentially to TUs. For example, as compared to applying intra prediction at PU level. Sequential intra prediction may permit use in intra prediction neighboring reference samples from previous reconstructed TUs that are closer to current TU samples.

Figure 5:
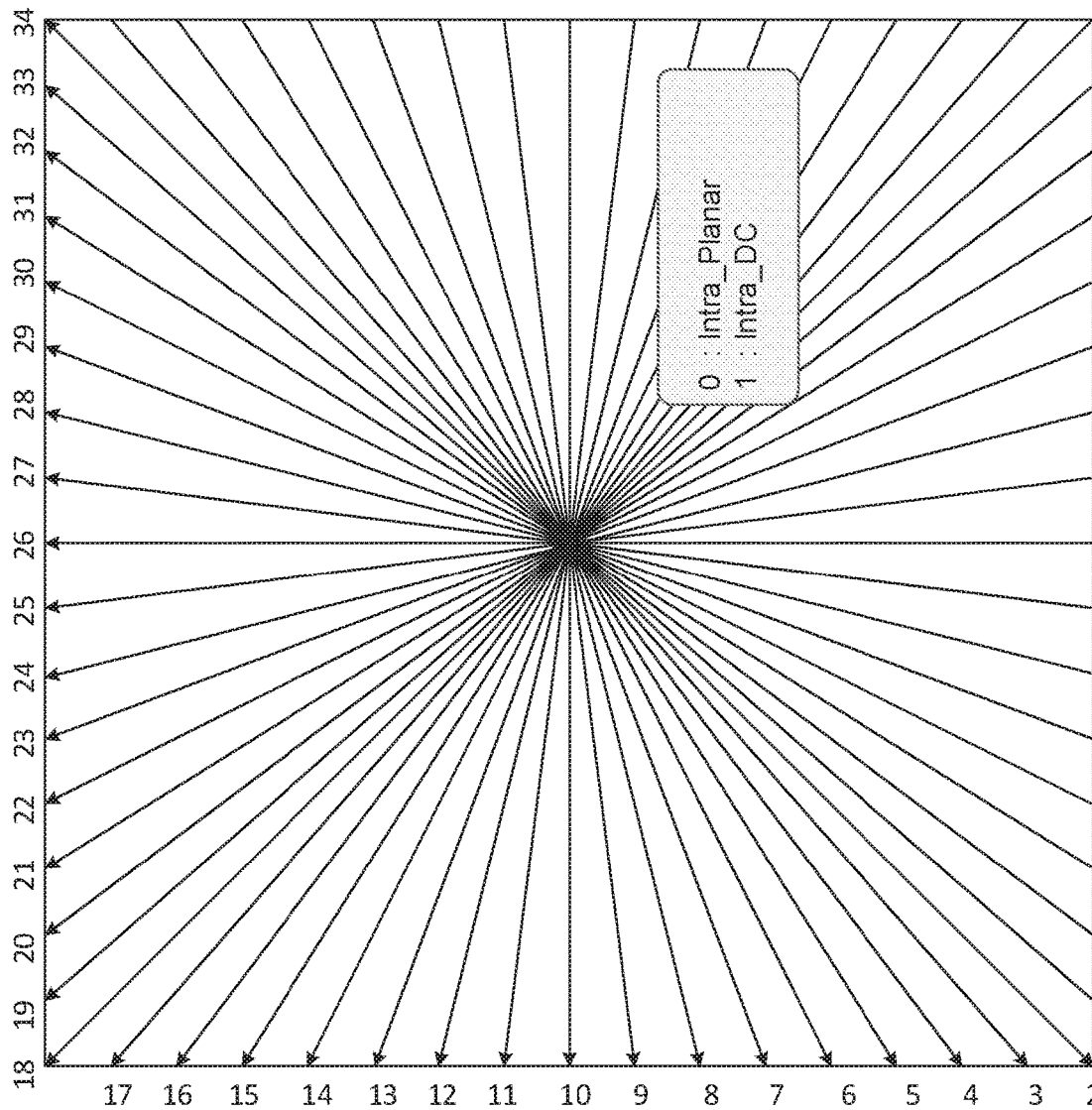
FIG. 5 shows an example of angular intra prediction modes.

FIG. 5 shows an example of angular intra prediction modes. HEVC may support one or more (e.g. 35) intra prediction modes. The one or more intra prediction modes may include a DC mode, a planar mode, and/or 33 directional or 'angular' intra prediction modes.

Angular intra prediction may be used to efficiently model different directional structures in video and image content. The number and angularity of prediction directions may be selected based on a trade-off between encoding complexity and coding efficiency.

A predicted sample $P_{x,y}$ may be obtained, for example, by projecting its location to a reference row or column of pixels, applying a selected prediction direction, and interpolating a predicted value for the sample at 1/32 pixel accuracy. Interpolation may be performed linearly utilizing the two closest reference samples, e.g., $R_{i,0}$ and $R_{i+1,0}$ for vertical prediction (e.g. mode 18~34 as shown in FIG. 5) and $R_{0,i}$ and $R_{0,i+1}$ for horizontal prediction (e.g. mode 2~17 as shown in FIG. 5).

HEVC may support one or more intra prediction modes for luma intra prediction for a variety of (e.g. all) PU sizes. HEVC may define multiple (e.g. three) most probable modes (MPMs) for a (e.g. each) PU, for example, based on the modes of one or more neighboring PUs. A current intra prediction mode may be equal to one of the elements in a set of MPMs. An index in the set may be transmitted to the decoder. A code (e.g. a 5-bit fixed length code) may be used to determine a selected mode outside the set of MPMs.

Reference samples may be smoothed. In an example, a 3-tap smoothing filter may be applied to one or more reference samples. The smoothing may be applied, for example, when an intra_smoothing_disabled_flag is set to 0. Filtering may be controlled, for example, by a given intra prediction mode and/or transform block size. In an example, e.g., for 32×32 blocks, angular modes may use filtered reference samples, for example, except horizontal and vertical angular modes. In another example, e.g., for 16×16 blocks, modes not using filtered reference samples may be extended to four modes (e.g. 9, 11, 25, 27) closest to horizontal and vertical as shown in FIG. 5. In another example, e.g., for 8×8 blocks, diagonal modes (2, 18, 34) may use filtered reference samples.

Intra prediction may be applied for a chroma component. In an example, an intra prediction mode may be specified, e.g., as planar, DC, horizontal, vertical, 'DM_CHROMA' mode, diagonal mode (34), for example, for one or more prediction blocks (PBs) associated with chroma.

Table 1 shows an example mapping between an intra prediction mode and an intra prediction direction for chroma. A chroma color channel intra prediction mode may be based on a corresponding luma PB intra prediction mode and/or an intra_chroma_pred_mode syntax element.

TABLE 1

| | Luma intra prediction direction, X | | | | |
|---|---|---|---|---|---|
| intra_chroma_pred_mode | 0 | 26 | 10 | 1 | Otherwise (0 <= X <= 34) |
| 0 | 34 | 0 | 0 | 0 | 0 |
| 1 | 26 | 34 | 26 | 26 | 26 |
| 2 | 10 | 10 | 34 | 10 | 10 |
| 3 | 1 | 1 | 1 | 34 | 1 |
| 4 (DM_CHROMA) | 0 | 26 | 10 | 1 | X |

Table 2 shows an example specification of intra prediction mode for 4:2:2 chroma format, e.g., when a DM_CHROMA mode is selected and a 4:2:2 chroma format is in use. An intra prediction mode for a chroma PB may be derived, for example, from an intra prediction mode for a corresponding luma PB, e.g., as specified in Table 2.

TABLE 2

| intra pred mode | 0 | 1 | 2 | 3 | 4 | 5 | 6 | 7 | 8 | 9 | 10 | 11 | 12 | 13 | 14 | 15 | 16 | 17 |
|---|---|---|---|---|---|---|---|---|---|---|---|---|---|---|---|---|---|---|
| intra pred mode for 4:2:2 chroma | 0 | 1 | 2 | 2 | 2 | 2 | 3 | 5 | 7 | 8 | 10 | 12 | 13 | 15 | 17 | 18 | 19 | 20 |
| intra pred mode | | | 18 | 19 | 20 | 21 | 22 | 23 | 24 | 25 | 26 | 27 | 28 | 29 | 30 | 31 | 32 | 33 | 34 |
| intra pred mode for 4:2:2 chroma | | | 21 | 22 | 23 | 23 | 24 | 24 | 25 | 25 | 26 | 27 | 27 | 28 | 28 | 29 | 29 | 30 | 31 |

Figure 6:
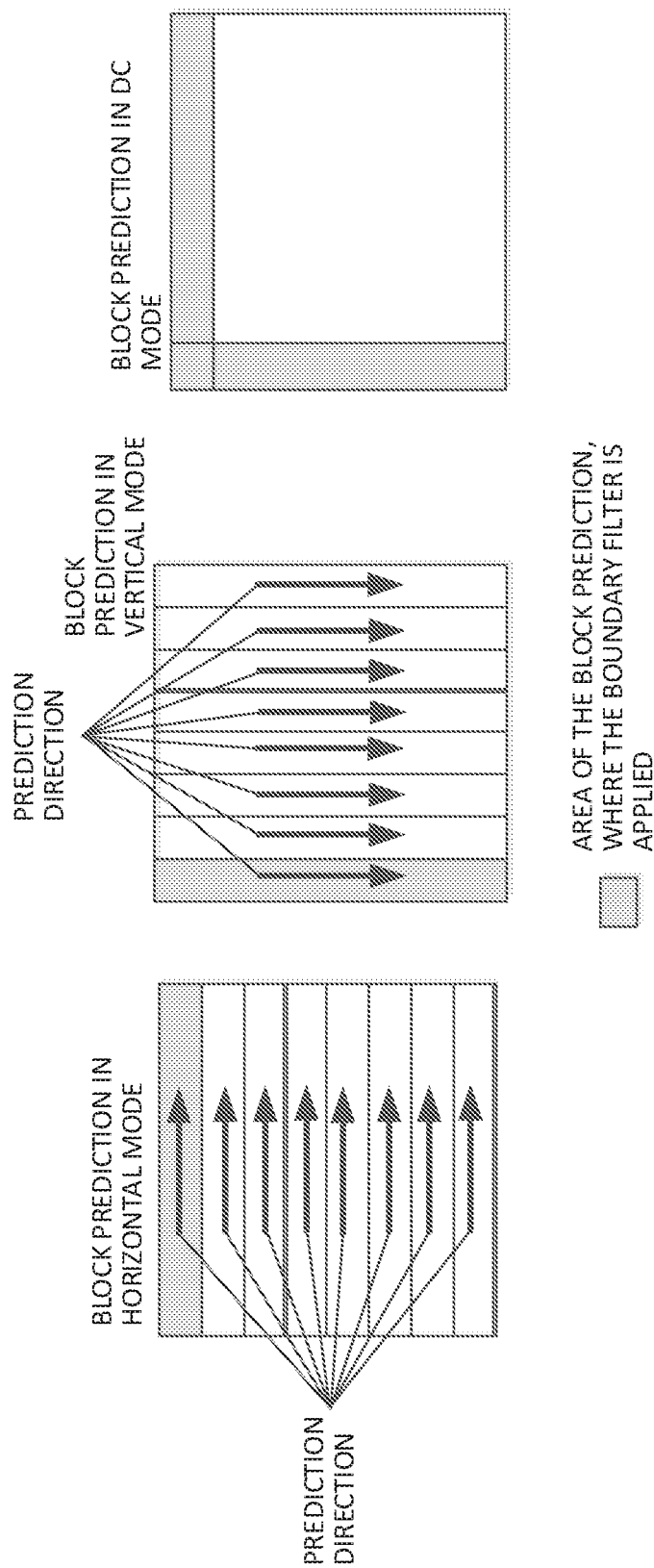
FIG. 6 shows an example of an intra boundary filter.

FIG. 6 shows an example of an intra boundary filter. An intra-boundary filter may be used, for example, when reconstructing intra-predicted transform blocks (TBs). An intra-boundary filter may be used, for example, to filter predicted luma samples along the left and/or top edges of the TB for PBs using horizontal, vertical, and/or DC intra prediction modes, e.g., as shown in FIG. 6.

An intra boundary filter may be defined, for example, based on an array of predicted samples p as an input and/or predSamples as an output.

Intra boundary filtering provided by Eq. (1) may be used to generate predSamples as an output, for example, for horizontal intra-prediction applied to luma transform blocks of size (nTbS) less than 32×32, disableIntraBoundaryFilter equal to 0, where x=0 . . . nTbS−1, y=0:

$$\text{predSamples}_{x,y}=\text{Clip1}_Y(P_{-1,y}+((P_{x,-1}-P_{-1,-1})>>1)) \quad (1)$$

Intra boundary filtering provided by Eq. (2) may be used to generate predSamples as an output, for example, for vertical intra-prediction applied to luma transform blocks of size (nTbS) less than 32×32, disableIntraBoundaryFilter equal to 0, where x=0 . . . nTbS−1, y=0:

$$\text{predSamples}_{x,y}=\text{Clip1}_Y(P_{x,-1}+((P_{-y}-P_{-1,-1})>>1)) \quad (2)$$

Intra boundary filtering provided by Eq. (3), Eq. (4) and Eq. (5) may be used to generate predSamples as an output, for example, for DC intra-prediction applied to luma transform blocks of size (nTbS) less than 32×32 and a DC predictor dcVal:

$$\text{predSamples}_{0,0}=(P_{-1,0}+2*dcVal+P_{0,-1}+2)>>2 \quad (3)$$

$$\text{predSamples}_{x,0}=(P_{x,-1}+3*dcVal+2)>>2, \text{ with } x=1 \ldots n\text{TbS}-1 \quad (4)$$

$$\text{predSamples}_{0,y}=(P_{-1,y}+3*dcVal+2)>>2, \text{ with } y=1 \ldots n\text{TbS}-1 \quad (5)$$

An improvement may be provided by boundary smoothing, e.g. 0.4% average improvement. An intra boundary filter may be applied on a luma component. An intra boundary filter may not be applied on a chroma component, e.g., because prediction for chroma components tends to be smooth.

HEVC intra mode residual coding may utilize intra mode dependent transforms and/or coefficient scanning to code residual information. A discrete sine transform (DST) may be selected for 4×4 luma blocks. A discrete cosine transform (DCT) may be selected/used for other types of blocks.

A linear-model (LM) based chroma intra prediction mode may be used, for example, to predict chroma samples from collocated reconstructed luma samples using a linear model (LM), e.g., in accordance with Eq. (6):

$$\text{Pred}_C[x,y]=\alpha \cdot \text{Rec}_L[x,y]+\beta \quad (6)$$

where $\text{Pred}_C$ may indicate predicted chroma samples in a block and $\text{Rec}_L$ may indicate corresponding reconstructed luma samples in a block. Parameters α and β may be derived from causal reconstructed luma and chroma samples around a current block.

Linear model chroma intra prediction may improve coding efficiency. As an example, experimental results in a test configuration indicate average Bjøntegaard delta rate (BD-rate) reductions of Y, Cb, Cr components comprising 1.3%, 6.5% and 5.5%, respectively. In an example, a similar level of coding efficiency improvements of chroma components may be provided in a test configuration.

Figure 7:
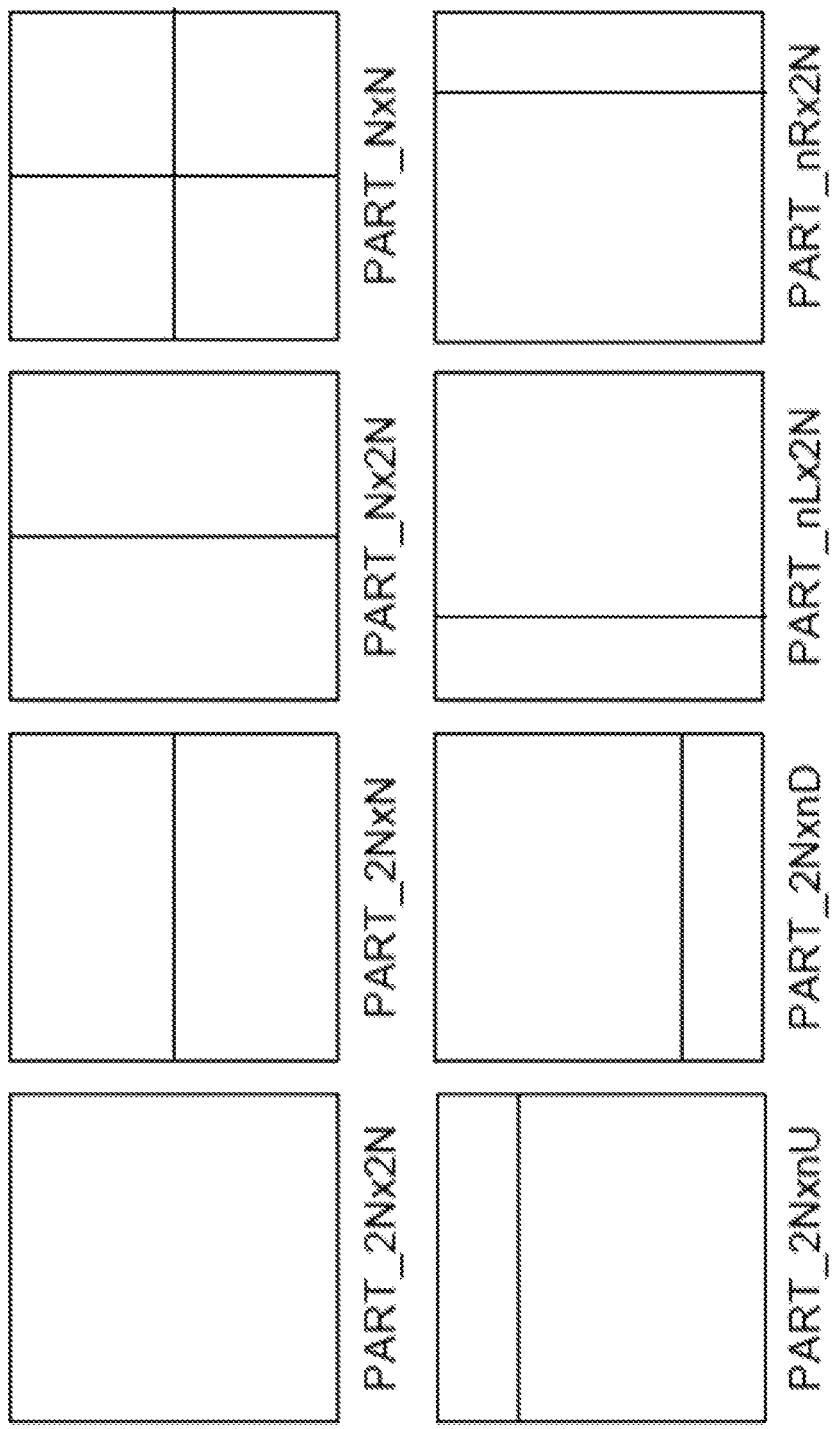
FIG. 7 shows an example of different partitions HEVC inter-prediction coding.

FIG. 7 shows an example of different partitions for HEVC inter-prediction coding. Inter coding may be used, for example, to remove or reduce temporal redundancy. HEVC inter-prediction coding may support more PB partition shapes than intra-prediction coding (e.g., intra-coding). Intra prediction may support, for example, partitions PART_2N×2N, PART_2N×N, PART_N×2N, PART_N×N. Inter-picture prediction may support, for example, partitions PART_2N×2N, PART_2N×N, PART_N×2N, PART_N×N and asymmetric motion partitions PART_2N×nU, PART_2N×nD, PART_nL×2N, and PART_nR×2N.

An (e.g. each) inter-predicted PU may have a set of motion parameters comprising one or more motion vectors and one or more reference picture indices. A P slice may, for example, use one reference picture list and a B slice may, for example, use two reference picture lists. Inter-prediction samples of a PB may be determined from one or more samples of a corresponding block region in a reference picture identified by a reference picture index. The reference picture index may be at a position displaced by horizontal and vertical components of a motion vector (MV).

Figure 8A:
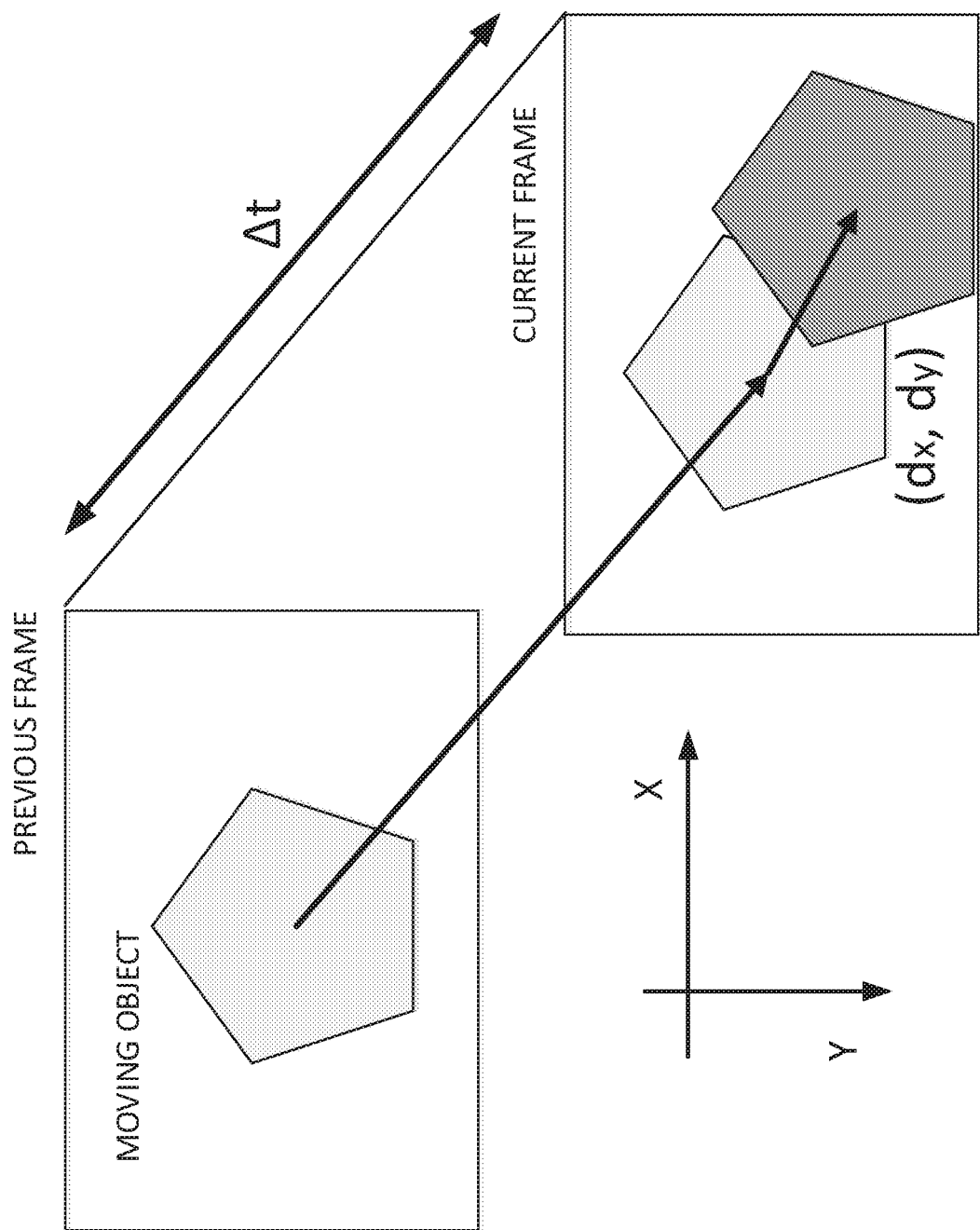
FIG. 8A shows an example of motion compensated prediction using motion vectors.

FIG. 8A shows an example of motion compensated prediction using motion vectors (MVs). Horizontal and vertical motion vectors may be denoted as $d_x$ and $d_y$, respectively.

Figure 8B:
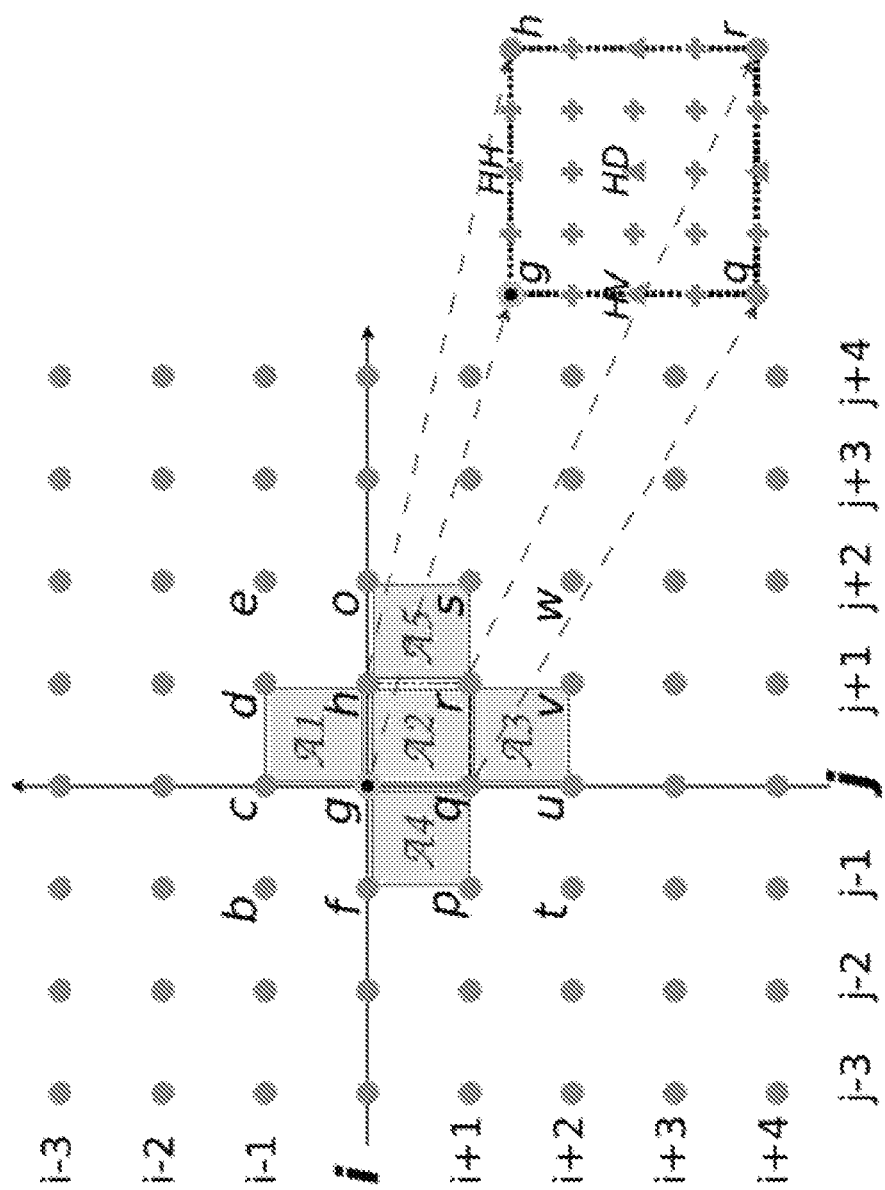
FIG. 8B shows an example of fractional pixel interpolation.

FIG. 8B shows an example of fractional sample interpolation. Fractional sample interpolation may be used, for example, when a motion vector has a fractional value. Fractional sample interpolation may generate prediction samples for non-integer sample positions. HEVC may support MVs, for example, with units of a of the distance between luma samples. HEVC may support MVs, for example, with units of ⅛ of the distance between chroma samples, e.g., in 4:2:0 format.

Motion vector prediction may exploit spatial-temporal correlation of a motion vector with neighboring PUs. A merge mode may be used, for example, to reduce motion vector signaling cost. A merge mode merge candidate list may comprise a list of motion vector candidates from neighboring PU positions (e.g. spatial neighbors and/or temporal neighbors) and/or zero vectors. An encoder may select a (e.g. the best) predictor from a merge candidate list and may transmit a corresponding index indicating the predictor chosen from the merge candidate list.

Cross plane filtering may use high frequency information from luma, for example, to improve and enhance chroma quality. High frequency information may be extracted from luma, for example, by applying a high pass filter on the luma component.

Luma and chroma components may have some correlations, such as object contours and edge areas. Cross-plane filtering for chroma enhancement may include applying high pass filtering to a luma component. An output of the high pass filtering may be added to the chroma component to determine an enhanced chroma component. The output of the high pass filtering may be an offset. Eq. 7 and Eq. 8 indicate an example of a chroma enhancement:

$$Y_{offset} = Y_{rec} \otimes \text{cross\_plane\_filter} \quad (7)$$

$$C_{enh} = C_{rec} + Y_{offset} \quad (8)$$

where Y is Luma, C is chroma, cross_plane_filter is a filter applied to the luma signal, $Y_{rec}$ is the reconstructed luma signal, $Y_{offset}$ is the output of the filtering, $C_{rec}$ is the reconstructed chroma signal, which may be a Cb or Cr component and $C_{enh}$ is the enhanced chroma signal. The filter may be a 1D or 2D filter. A cross plane filter may be derived, for example, based on original chroma and luma and/or reconstructed chroma and luma, e.g., using a Least Square method.

A luma prediction mode may be utilized in DM_CHROMA mode for intra prediction, for example, to derive a chroma prediction mode that reduces a signaling overhead of a chroma prediction mode. The chroma prediction mode may be signaled as DM_CHROMA, for example, when a chroma prediction block (PB) utilizes the same prediction mode as a corresponding luma PB. A linear model (LM) chroma prediction mode may predict one or more chroma samples from collocated reconstructed luma samples, for example, by a linear model.

Reference chroma samples ($R_{x,y}$), corresponding chroma prediction samples ($P_{x,y}$), and reconstructed chroma samples may be processed independently of their corresponding luma component(s). For example, for inter prediction, chroma prediction samples and chroma reconstructed samples may be generated independently from their corresponding luma component(s). Cross-plane filtering may be applied at different stages of the intra coding process.

Cross-plane filtering may be used to enhance one or more neighboring chroma samples. The one or more neighboring chroma samples may neighbor the current video block. The neighboring chroma samples may include reference chroma samples, reconstructed chroma samples, and/or predicted chroma samples. For example, a predicted chroma sample may be used for prediction. Neighboring reference chroma samples, $R_{x,y}$, may be used to generate predicted chroma samples $P_{x,y}$, for intra coding, e.g., as shown in FIG. 3. Cross-plane chroma filtering may derive high fidelity information from one or more luma samples that correspond to a chroma sample of the one or more neighboring chroma samples, for example, to improve chroma in coding color space.

A cross plane filter may be applied to one or more neighboring luma samples. The neighboring luma sample(s) may include reference luma samples, reconstructed luma samples, and/or predicted luma samples. Derived high pass information may be used, for example, to enhance the quality of chroma reference samples. Enhanced reference chroma samples may be used to generate predicted chroma samples.

One or more enhanced chroma samples may be determined using cross plane filtering. For example, a cross plane filter may be applied to one or more neighboring luma samples. The cross plane filter may be a high pass filter. The one or more neighboring luma samples may correspond to a chroma sample to be enhanced. The cross plane filter may be applied to available and/or unavailable luma samples. A predicted luma sample and/or a reconstructed luma sample (e.g., before or after loop filtering) may be an available luma sample. A non-reconstructed luma sample and/or a non-predicted luma sample may be an unavailable luma sample.

Figure 9:
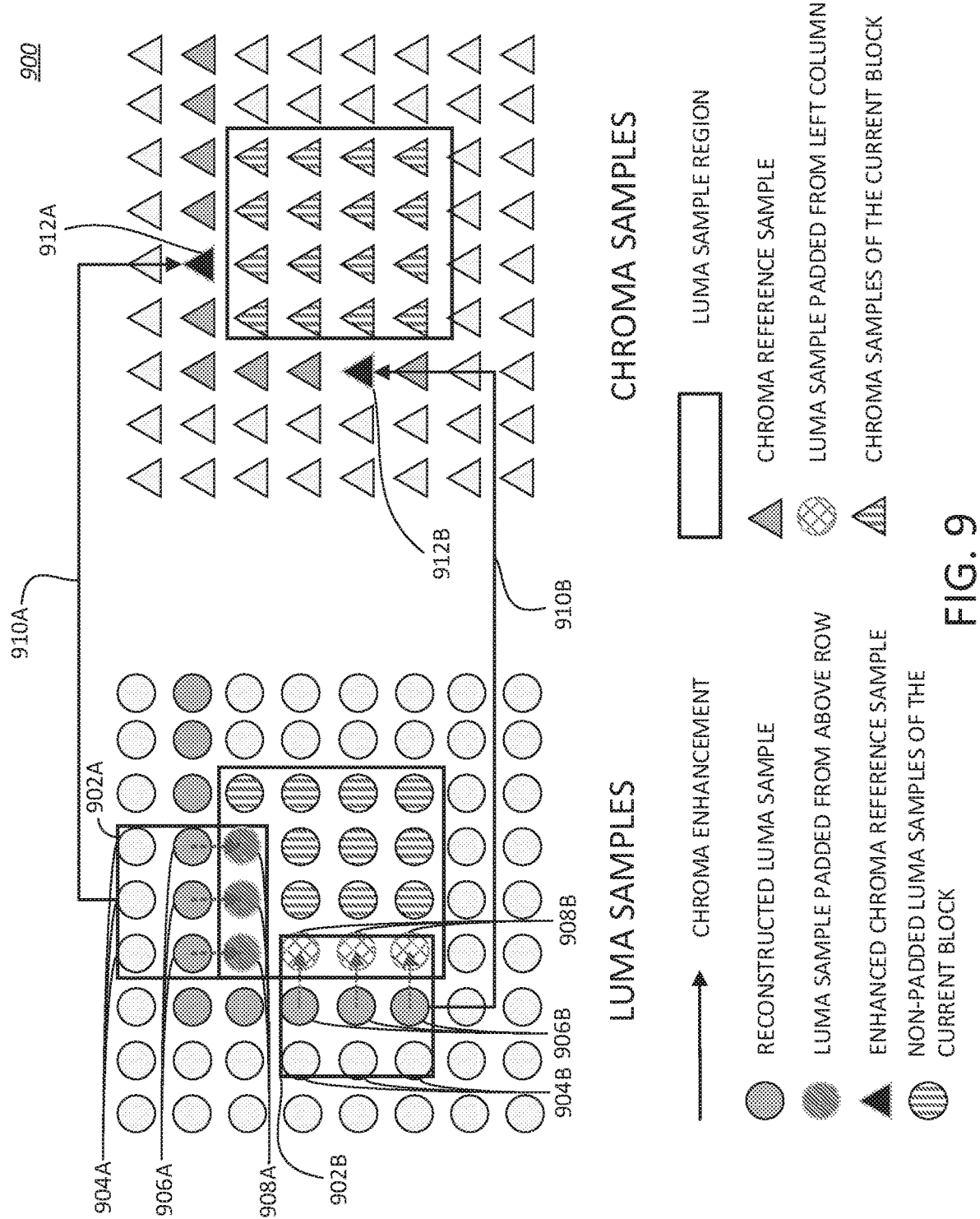
FIG. 9 shows an example of chroma reference sample enhancement with cross plane filtering that does not use reconstructed luma samples from the current block.

FIG. 9 is an example of chroma reference sample enhancement 900 with cross plane filtering that does not use reconstructed luma samples from a current video block. The current video block may include a 4×4 block of samples, e.g., as defined by a solid line in FIG. 9.

One or more luma sample regions such as 902A, 902B may be determined for a current picture. As shown, a luma sample region such as 902A, 902B may include a plurality of luma samples that neighbor a corresponding chroma sample and/or a luma sample that is collocated to the corresponding chroma sample. A sample may neighbor another sample if it is above, below, to the left of, to the right of, and/or diagonal to the other sample. For example, a neighboring sample may be next to the corresponding sample. Collocated samples may include a luma sample at the same location as a chroma sample. The luma sample region 902A may be determined to include one or more neighboring luma samples and/or a collocated luma sample. The luma sample region 902A may be determined such that a chroma sample for enhancement (e.g., enhanced chroma sample 912A) is at the center of each of the one or more luma sample regions 902A, 902B, respectively. For example, the chroma sample that is located at the center of a luma sample region may be enhanced using the cross plane filtering.

The luma samples in a luma sample region such as 902A, may include one or more luma sample(s) 904A reference luma sample(s) 906A, and/or predicted luma sample(s) 908A. The reference luma samples 906A may be reconstructed luma samples used to replace predicted luma sample(s) 908A. For example, each of the one or more predicted luma samples 908A, 908B may be replaced by (e.g., padded from) a respective neighboring reconstructed luma sample of the one or more reconstructed luma samples 906. For example, a luma sample region 902A, 902B may be an M×N window of luma samples, e.g., such as the 3×3 window highlighted by a dashed box in FIG. 9. The luma samples in the M×N window may correspond to a chroma sample location. A cross plane filter may be applied to the plurality of luma samples of the luma sample region 902A. 902B. An offset may be determined as an output of applying the cross plane filter to the plurality of luma samples of the luma sample region 902A, 902B. The offset may be applied 910A, 910B (e.g., added) to the corresponding chroma sample, for example, to determine an enhanced chroma sample, such as 912A, 912B. The cross plane filter may be applied to a plurality of luma sample regions, such as 902A, 902B in the current picture to determine a plurality of enhanced chroma samples 912A, 912B. An enhanced chroma sample, such as enhanced chroma samples 912A, 912B may be used as reference samples for intra-prediction of the current video block.

In an example, the plurality of luma samples in an M×N luma sample region, e.g., a 3×3 window, may include (e.g. only) reconstructed luma samples before or after in-loop filtering. For example, the plurality of luma samples in the M×N luma sample region may be available. In another example, one or more luma samples in an M×N luma sample region may not have been reconstructed, e.g., as shown in FIG. 9. Luma samples that have not been reconstructed may be unavailable luma samples. The unavailable luma samples may be replaced by (e.g., padded using) a neighboring available (e.g., reconstructed) luma sample. Prediction and reconstruction of luma and chroma samples in the current block may be performed in parallel.

Figure 10:
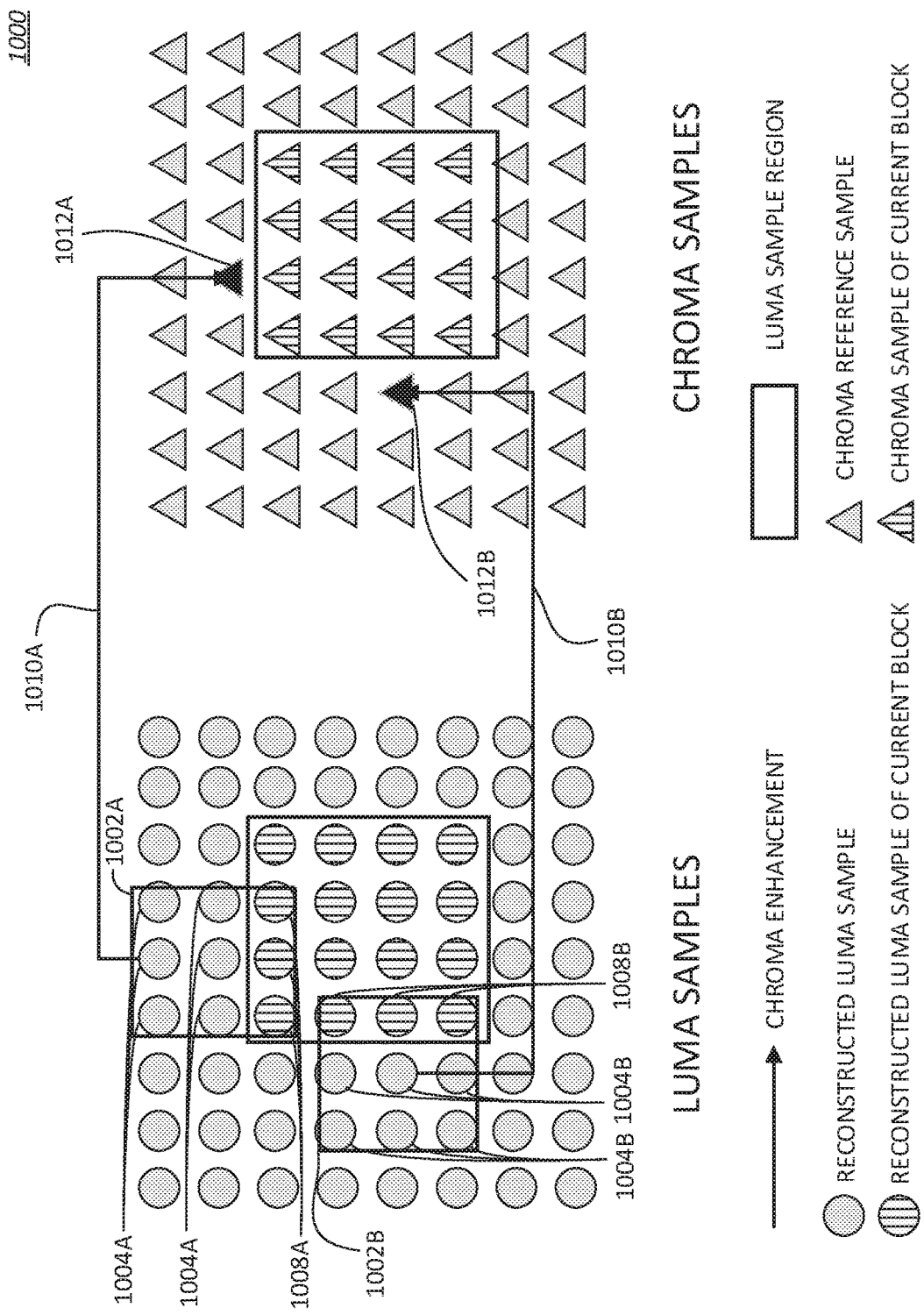
FIG. 10 shows an example of chroma reference sample enhancement with cross plane filtering using reconstructed luma samples from a current block.

FIG. 10 is an example of chroma reference sample enhancement 1000 with cross plane filtering using reconstructed luma samples from a current block. In an example, the luma samples in a current block may be reconstructed before the respective corresponding chroma samples, for example, when higher latency between different color channels may be tolerated. Reconstructed luma samples in an M×N (e.g. 3×3) luma sample region 1002A, 1002B may be available, e.g. without padding, when the cross plane filter is applied. The luma sample region 1002A, 1002B may be an M×N (e.g., 3×3) window.

For example, a luma sample region such as 1002A, 1002B may be determined for a current picture. A luma sample region such as 1002A, 1002B may include a plurality of luma samples that neighbor a corresponding chroma sample and/or a luma sample that is collocated with the corresponding chroma sample. The plurality of luma samples in each of the luma sample regions 1002A, 1002B may include one or more reconstructed luma samples 1004A, 1004B that are outside the current block, and/or one or more reconstructed luma samples 1008A, 1008B that are within the current block.

Cross plane filtering may be applied to the plurality of luma samples in the one or more luma sample regions 1002A, 1002B. The luma samples in the one or more luma sample regions 1002A, 1002B may include some luma samples within a current block (e.g., as shown in FIG. 9). The luma samples in the current block may include one or more reconstructed luma samples, e.g., before or after loop filtering.

One or more enhanced reference chroma samples 1012A, 1012B may be generated, for example, in accordance with Eq. 9:

$$R_{C\_enh}[x][y]=R_C[x][y]+S_L(x_L,y_L)\otimes\text{cross\_plane\_filter} \quad (9)$$

where $R_C[x][y]$ may be reconstructed reference chroma samples before enhancement, $R_{C\_enh}[x][y]$ may be enhanced reference chroma samples, $S_L(x_L, y_L)$ may be an array of reconstructed luma samples centering at position $(x_L, y_L)$. The one or more enhance reference chroma samples 1012A, 1012B may correspond to a center of the one or more luma sample regions 1002A, 1002B.

A luma sample position $(x_L, y_L)$ of a corresponding chroma sample position $(x, y)$ may be calculated based on chroma format, for example, in accordance with Eq. 10:

$$x_L=\text{scale}X*x$$

$$y_L=\text{scale}Y*y \quad (10)$$

where scaleX and scaleY may be, for example, (2,2), (2,1) (1,1), respectively, for chroma format 4:2:0, 4:2:2, and 4:4:4. Enhanced chroma reference samples $R_{C\_enh}[x][y]$ may be used in the intra prediction process, for example, using a directional/DC/planar intra prediction mode, e.g., as shown in FIG. 5.

A two-dimensional (2-D) cross plane filter may be applied to a luma sample region (e.g., an N×N region of luma samples as shown in FIGS. 9 and 10). A one-dimensional (1-D) cross plane filter may be applied to one or more luma samples in a 1×N or N×1 luma sample region. As an example, N horizontal luma reference samples above a current block may be filtered, for example, when an N×1 luma sample region is used in cross plane filtering. As an example, N vertical luma reference samples to the left of a current block may be filtered, for example, when a 1×N luma sample region is used in cross plane filtering.

In an example, a luma sample region may be adaptively selected, for example, based on an intra prediction mode. The intra prediction mode may be a directional (e.g., vertical, horizontal, etc.) intra prediction mode, a DC intra prediction mode, a planar intra prediction mode, or any other intra prediction mode. The cross plane filter to apply may be determined based on which intra prediction mode is selected. A different set of cross-plane filters may be selected, for example, to match the edge and/or boundary characteristics of various different modes. As an example, a vertical prediction mode may use the top row of reference samples. When the vertical prediction mode is selected, one or more chroma reference samples above the current video block may be enhanced. For example, a luma sample region may be selected such that it includes one or more luma samples that neighbor a corresponding chroma reference sample above the current video block. The luma sample region may include a luma sample that is collocated with the corresponding chroma reference sample above the current video block. As another example, when horizontal prediction mode is selected, one or more chroma reference samples to the left or right of the current video block may be enhanced. A luma sample region may be selected such that it includes one or more luma samples that neighbor a corresponding chroma reference samples to the left or right of the current video block. The luma sample region may include a luma sample that is collocated with the corresponding chroma reference sample to the left or right of the current video block. An edge may occur vertically, for example, when a vertical prediction mode is selected.

A luma sample region may be selected with a horizontal rectangular shape, for example, in comparison to a square 2-D luma sample region depicted in examples shown in FIGS. 9 and 10. For example, a 1-D horizontal luma sample region may be selected and/or applied for a vertical selection mode. I-D horizontal filtering (e.g., using the top neighboring luma samples) may be used, for example, to retrieve the vertical high pass edge information more effectively and/or reduce filtering complexity. In an example of adaptive filtering for a horizontal prediction mode, a left column of reference samples may be used. An edge may occur horizontally, for example, when horizontal prediction mode is selected. A luma sample region with a vertical rectangular shape may be used. For example, a 1-D vertical luma sample region may be selected and/or applied. A 1D vertical filtering (e.g. using the left neighboring luma samples) may retrieve the horizontal high pass edge information more effectively and/or reduce filtering complexity.

A luma sample region may be selected with an 'L' shape such that the luma sample region corresponds to the chroma samples in the current video block. For example, when DC intra-prediction mode is selected, the mean of the one or more reference samples to the left and above the current video block may be used to predict the one or more samples in the current video block. As another example, when planar intra-prediction mode is selected, a linear function of the one or more reference samples to the left and above the current video block may be used to predict the one or more samples in the current video block. When DC intra-prediction and/or planar intra-prediction mode is selected, the luma sample region may be selected such that the one or more reference chroma samples to the left and above the current video block are enhanced.

A chroma enhancement indicator may be signaled, for example, to indicate whether to enable or disable chroma enhancement. The chroma enhancement indicator may be signaled, for example, at slice level, picture level, group of picture level, or sequence level.

A chroma enhancement indicator may be signaled at a block level, for example, to indicate whether chroma enhancement processing is applied to a current coding block. The chroma enhancement indicator may be signaled, for example, when a current block is an intra coded block.

One or more cross plane filter coefficients may be derived at an encoder and transmitted to a decoder. A filter coefficient training, e.g., for enhancement filters applied to intra coded blocks to improve reference samples, may use intra coded samples. One or more cross plane filter coefficients may be transmitted, for example, at slice level, picture level, group of picture level, or sequence level. The one or more cross plane filter coefficients may be transmitted at a block level.

Figure 11:
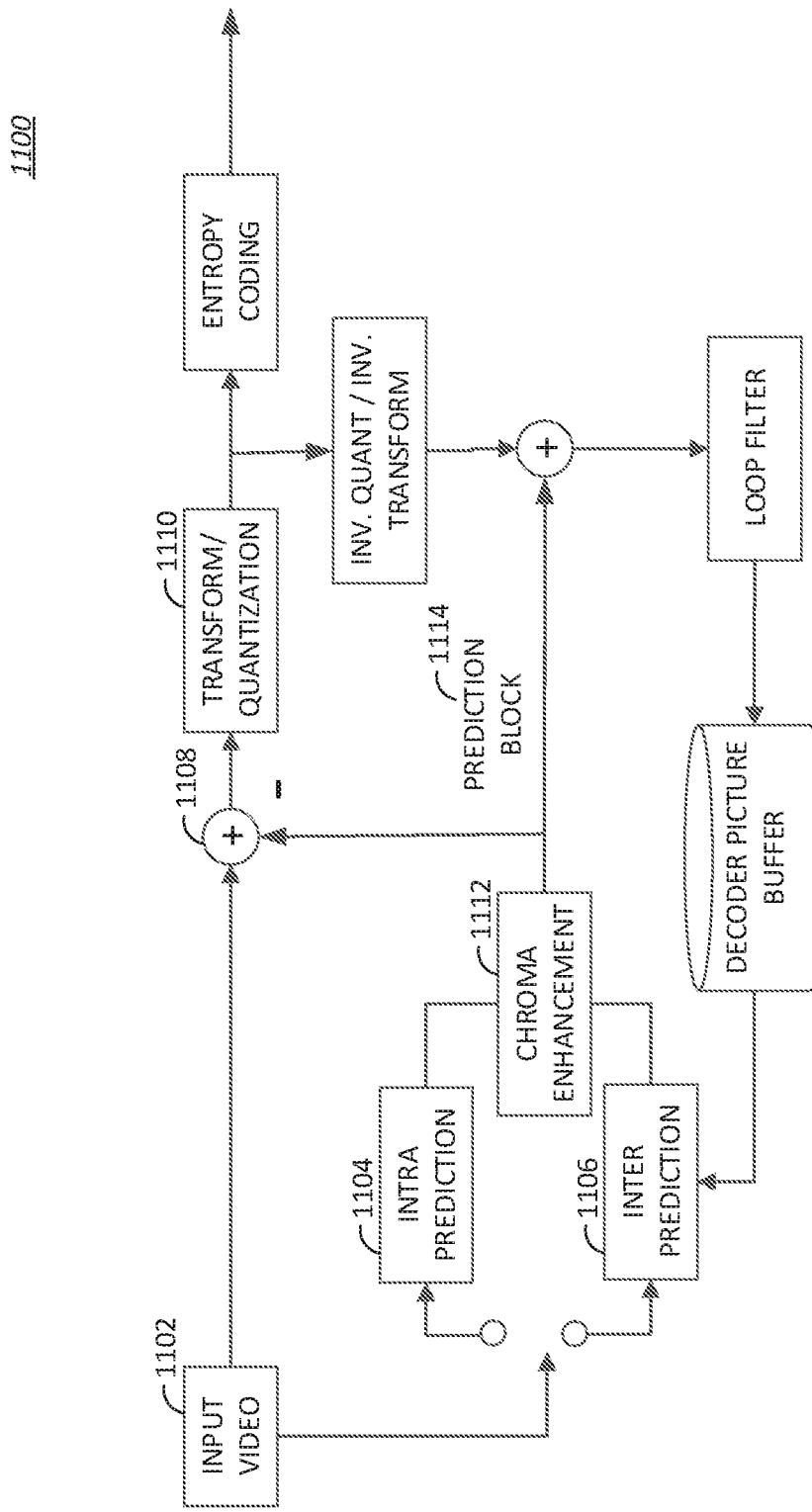
FIG. 11 shows an example of a block based hybrid encoder with predicted chroma sample enhancement.

FIG. 11 is an example of a block based hybrid video coding device 1100 (e.g., an encoder or a decoder) with predicted chroma sample enhancement. A prediction (e.g., intra prediction 1104 and/or inter prediction 1106) may be performed on an input video 1102. A prediction residual 1108 may be determined, for example by subtracting a prediction block 1114 from an original block of the input video 1102. The prediction residual 1108 may be transformed, for example, using DCT and/or DST block transforms, and/or quantized 1110. A prediction residual 1108 may be transformed for luma and/or chroma components of the input video 1102. Improving the accuracy of predicted chroma samples may improve coding efficiency. Chroma enhancement 1112 may be implemented, for example, by using a cross plane (e.g., high pass) filter to enhance one or more predicted chroma samples. Chroma samples may be enhanced, for example, for object contours and/or edge areas.

A cross plane filter may be used on one or more (e.g. all) predicted chroma samples of a current block, for example, using reconstructed luma samples of the same and neighboring blocks. For example, the one or more predicted chroma samples of a current block may be enhanced by applying a cross plane filter to a plurality of luma samples that correspond to the one or more predicted chroma samples. The current block may be an intra-coded video block. An enhanced predicted chroma sample may be generated, for example, as indicated in Eq. 11:

$$P_{C\_enh}[x][y]=P_C[x][y]+S_L(x_L,y_L) \otimes \text{cross\_plane\_filter} \quad (11)$$

where $P_C[x][y]$ may be a predicted chroma sample generated at chroma position (x,y). A predicted chroma sample $P_C[x][y]$ may be predicted using intra prediction or inter prediction. Although not shown in equation (11), a cross plane filter used in chroma enhancement may vary, for example, depending on the coding mode (e.g. intra or inter) for a current block. In an example, a plurality of (e.g. two) sets of cross plane filters may be trained separately. A first set of cross plane filters may be applied to one or more intra predicted chroma samples. A second set of cross plane filters may be applied to one or more inter predicted chroma samples.

$S_L(x_L, y_L)$ may be reconstructed luma samples at position $(x_L, y_L)$, where $(x_L, y_L)$ may be calculated based on chroma format, for example, as indicated in Eq. 12:

$$x_L=\text{scale}X*x$$

$$y_L=\text{scale}Y*y \quad (12)$$

where (scaleX, scaleY) may be (2,2), (2,1) and (1,1), respectively, for chroma format 4:2:0, 4:2:2 and 4:4:4.

A cross plane filter may be applied to one or more neighboring corresponding reference luma samples, for example, to improve the accuracy of one or more predicted chroma samples.

The cross plane filter may enhance the quality of the one or more predicted chroma samples. Prediction residual information may be smaller, leading to improved coding performance, for example, when enhanced predicted chroma samples are used to generate a prediction residual.

Cross plane filtering may be used to derive one or more enhanced chroma samples. For example, a cross plane filter may be applied to a neighborhood of luma samples (e.g., a luma sample region) that correspond to a current chroma sample location.

Figure 12:
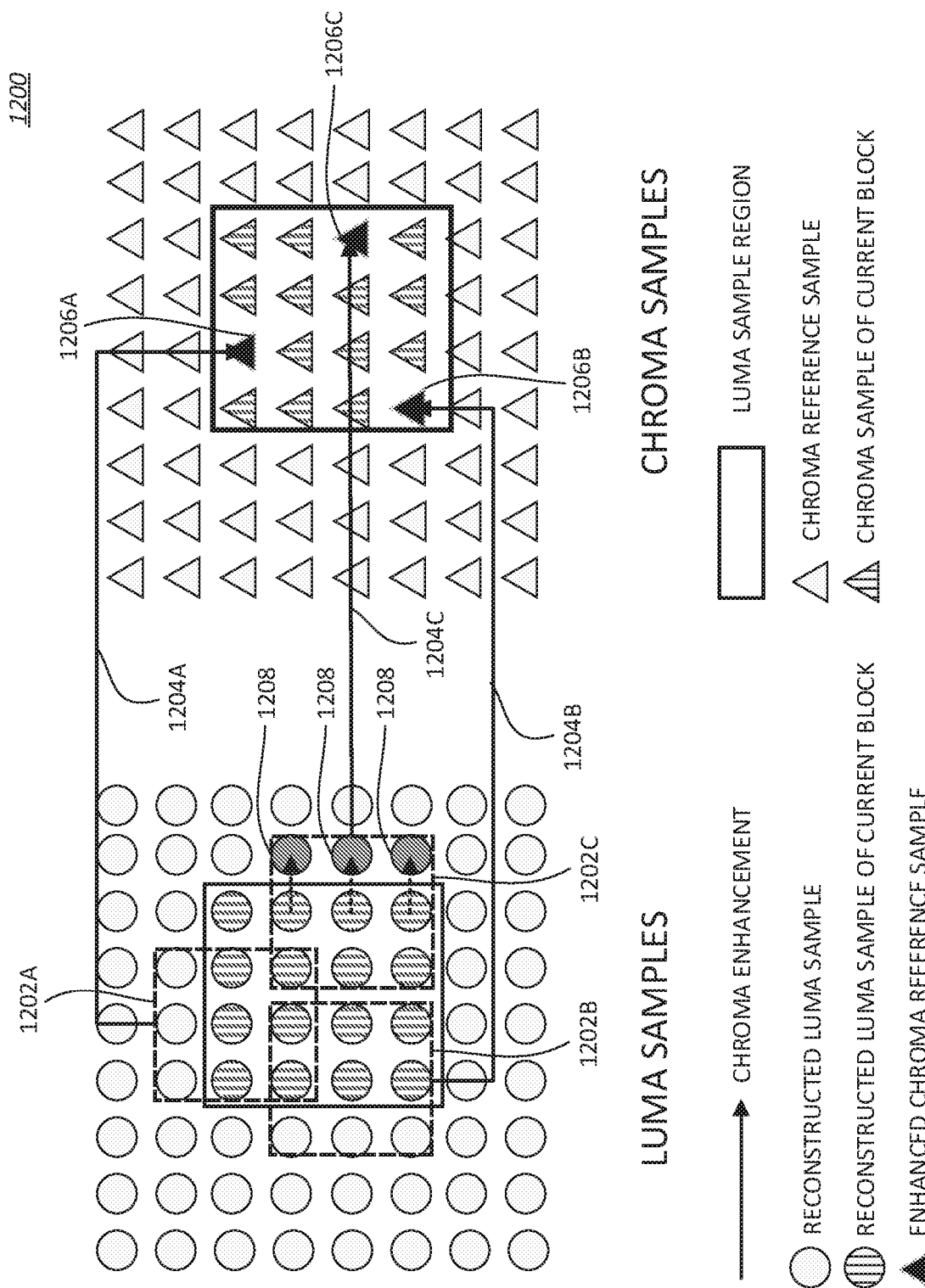
FIG. 12 shows an example of enhancing predicted chroma samples with cross plane filtering.

FIG. 12 is an example of enhancing predicted chroma samples with cross plane filtering. A plurality of luma sample regions 1202A, 1202B, 1202C may be determined. Each of the plurality of luma sample regions 1202A, 1202B, 1202C may correspond to a predicted chroma sample. A cross plane filter may be applied to a plurality of luma samples within a luma sample region 1202A, 1202B, 1202C (e.g. a 3×3 window of luma samples in the dashed box shown in FIG. 12). The cross plane filter may be applied to reconstructed luma samples within a current block (e.g. as indicated by vertical striped circles). The current block may be an intra-coded video block. An output may be determined. The output of applying the cross plane filter may be an offset, for example given by Eq. 11. An enhanced predicted chroma sample 1206A, 1206B, 1206C may be determined, for example, by applying (e.g., adding) the offset 1204A, 1204B, 1204C to a corresponding chroma sample to determine an enhanced chroma sample 1206A, 1206B, 1206C. Availability of corresponding reconstructed luma samples of the current block to be filtered for use in enhancing predicted chroma samples may introduce a coding latency between luma and chroma components on a particular block.

A cross plane filter may be applied on luma samples that are not yet reconstructed 1208. Luma samples that are not yet reconstructed 1208 may be padded, for example, using reconstructed luma samples that neighbor (e.g., to the left or top of) the not yet reconstructed luma samples 1208. For example, an unavailable luma sample may be replaced by a neighboring reconstructed luma sample.

Separate (e.g., different) filters may be applied, for example, depending on a prediction mode (e.g. intra or inter prediction). Other techniques (e.g. procedures) may be used to classify and apply different cross plane filters. As an example, a cross plane filter may be further classified or subclassified for applicability, for example, depending on whether integer or fractional (e.g. half or quarter) pixel motion vectors are used. A cross plane filter may be classified and/or subclassified for applicability for example, depending on which reference picture is used in inter prediction. The cross plane filter may be adaptively selected and/or applied these and other coding parameters.

Figure 13:
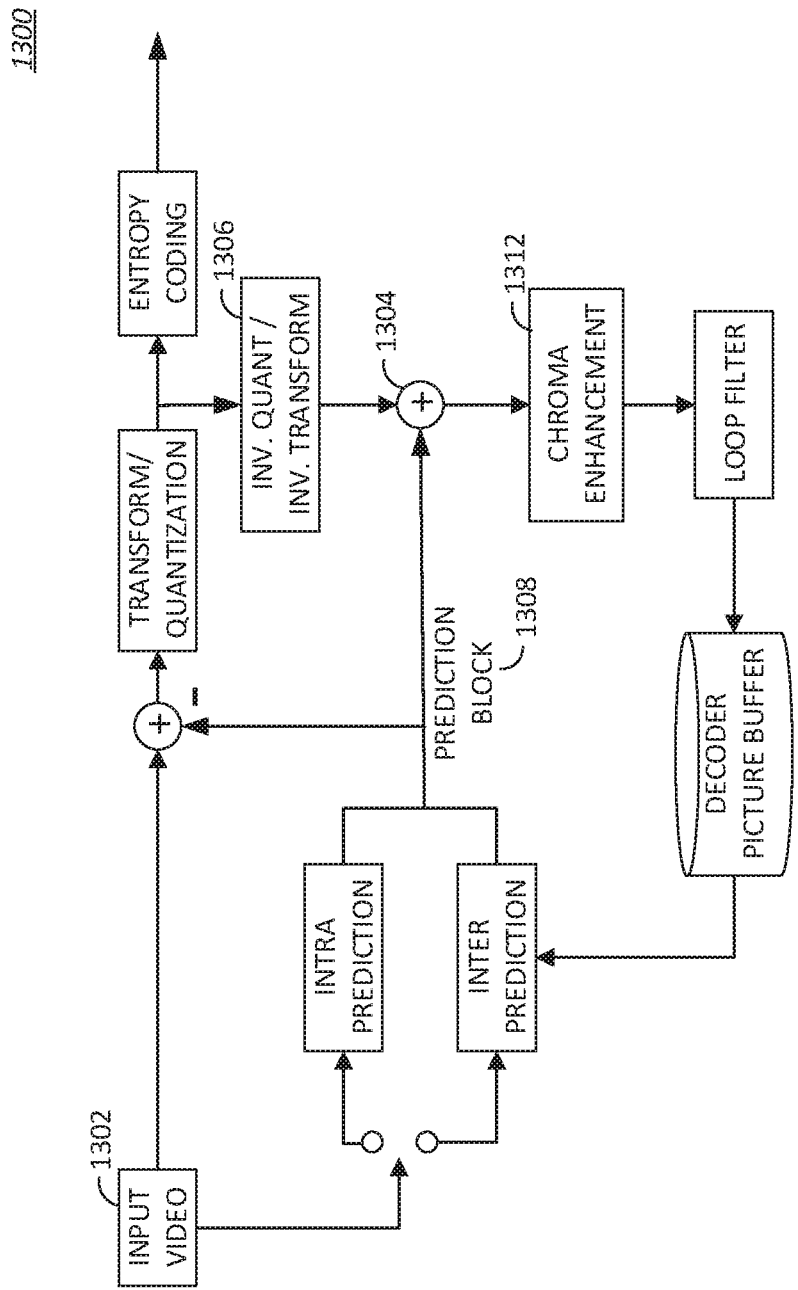
FIG. 13 shows an example of a block based hybrid encoder with chroma enhancement on reconstructed chroma samples.

FIG. 13 is an example of a block based hybrid video coding device 1300 (e.g., an encoder or a decoder) with chroma enhancement on reconstructed chroma samples. For example, chroma enhancement may be applied after prediction and reconstruction. A reconstructed block 1304 (e.g. before in-loop filtering) of an input video 1302 may be generated, for example, by adding a reconstructed residual block from the inverse quantization/inverse transform 1306 to a prediction block 1308. Enhancement of reconstructed chroma samples may improve the overall picture quality and/or may improve coding efficiency of the following blocks or pictures. Chroma enhancement 1312 may be implemented, for example, by applying a cross plane filter. Applying the cross plane filter may enhance one or more reconstructed chroma samples, e.g., at object contours and/or edge areas. The one or more reconstructed chroma samples may be enhanced before or after in-loop filtering.

In an example, a cross plane filter may be applied to reconstructed luma samples, $S_L[x][y]$, for example, to enhance the reconstructed chroma samples of a current block. Enhanced reconstructed chroma samples may be calculated, for example, in accordance with Eq. 13:

$$S_{C\_enh}[x][y]=S_C[x][y]+S_L(x_L,y_L)\otimes\text{cross\_plane filter} \quad (13)$$

where $S_C[x][y]$ may be reconstructed chroma samples and $S_{C\_enh}[x][y]$ may be enhanced reconstructed chroma samples.

Figure 14:
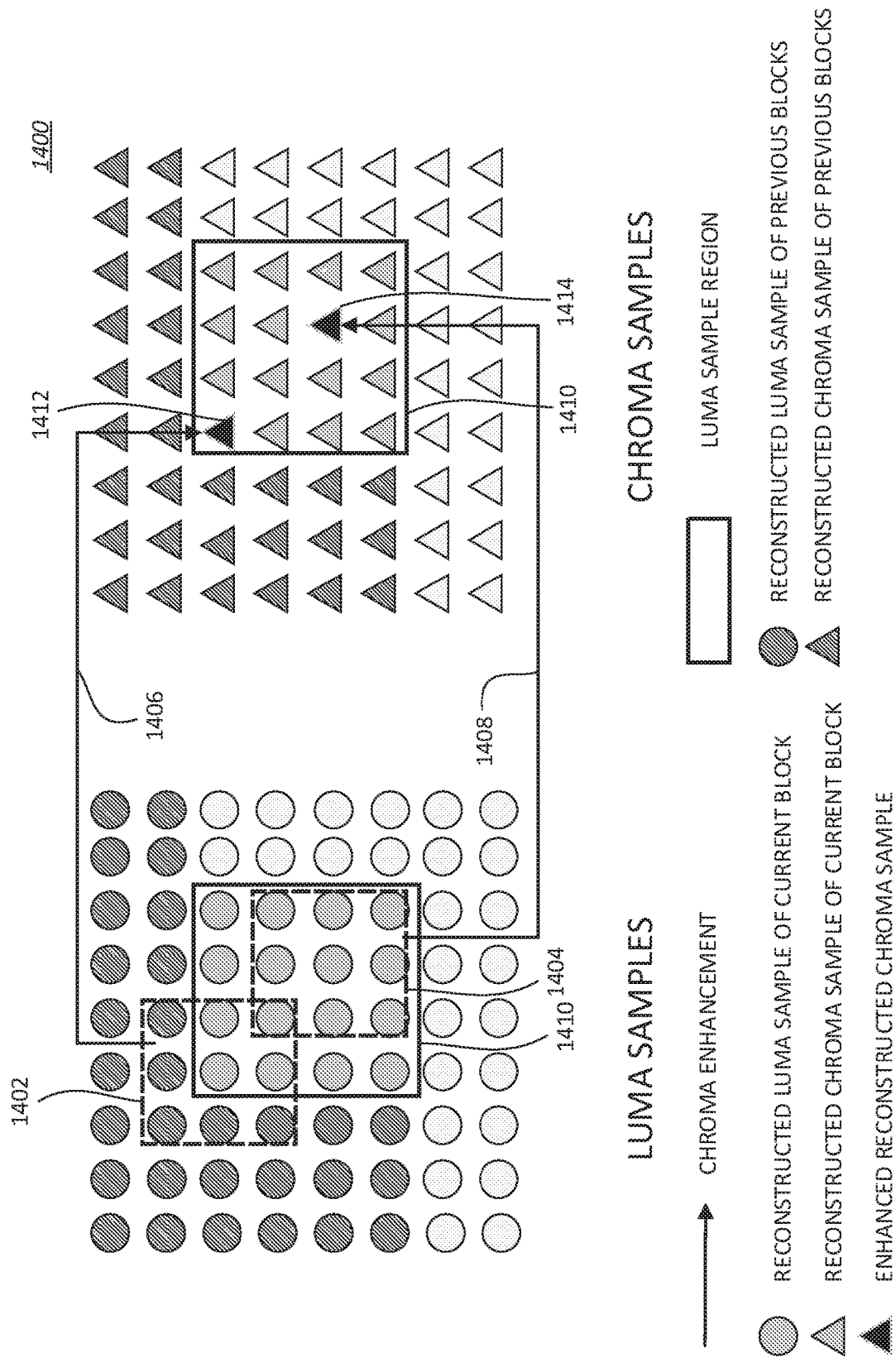
FIG. 14 shows an example of chroma reconstructed sample enhancement with cross plane filtering.

FIG. 14 is an example of enhancement of one or more chroma reconstructed samples with cross plane filtering. A plurality of luma sample regions 1402, 1404 may be determined. A first luma sample region 1402 may include a plurality of reconstructed luma samples from a current block 1410. A second luma sample region 1404 may include a plurality of reconstructed luma samples from the current block 1410 and a plurality of reconstructed luma samples from one or more previous blocks.

A cross plane filter may be applied to one or more reconstructed luma samples $S_L(x_L, y_L)$. One or more reconstructed chroma samples $S_C[x][y]$ of a current block 1410 may be enhanced, for example, by applying 1406, 1408 (e.g., adding) the output of the selected and applied cross plane filter to a corresponding reconstructed chroma sample to generate one or more enhanced reconstructed chroma samples 1412, 1414, $S_{C\_enh}[x][y]$. For example, a luma sample region such as luma sample region 1402 may include one or more reconstructed luma samples from a current block 1410 and one or more reconstructed luma samples from one or more previous blocks.

Cross plane filter classification, adaptive selection, and application, e.g., as described herein, may be applicable to enhancement of reconstructed chroma samples. A cross plane filter classification may depend, for example, on a block prediction mode (e.g. intra or inter), a motion vector precision, and/or a reference picture, etc.

Signaling of filter coefficients may be performed, for example, as described herein. One or more sets of cross plane filters may be signaled in the bitstream. The one or more sets of cross plane filters may be signaled based on the filter classification methods utilized. A number of filter sets to be signaled may be denoted as N. The filter coefficients of N sets of cross plane filters may be transmitted over slice level, picture level, group of picture level, or sequence level. A decoder may select one or more appropriate cross plane filters based on the coding mode, motion vector precision, and/or a reference picture of the current block. The decoder may apply one or more appropriate cross plane filters, for example, based on the coding mode, motion vector precision, and/or reference picture of the current block.

Figure 15A:
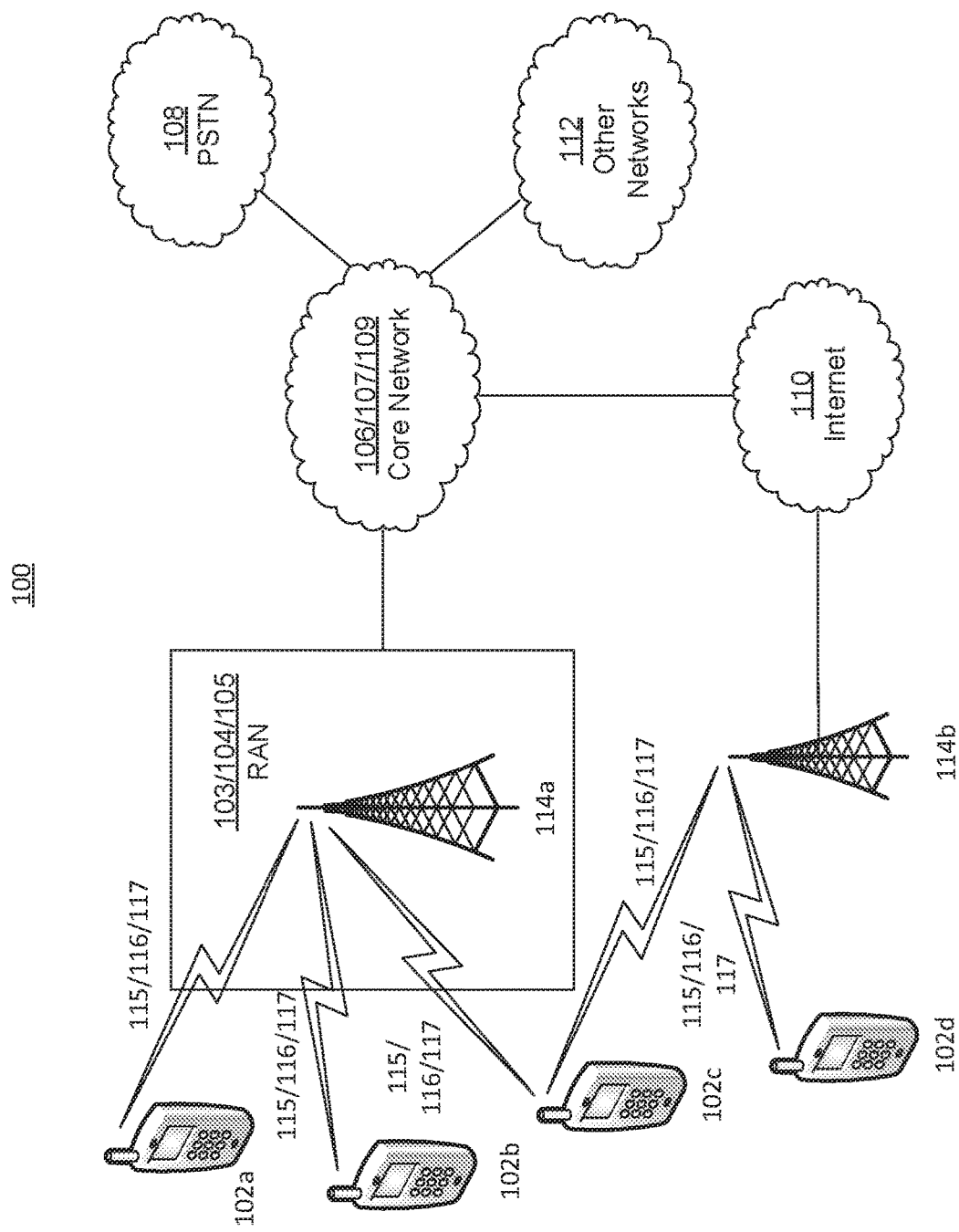
FIG. 15A is a system diagram of an example communications system in which one or more disclosed embodiments may be implemented.

FIG. 15A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 15A, the communications system 100 may include wireless transmit/receive units (WTRUs) 102a, 102b, 102c, and/or 102d (which generally or collectively may be referred to as WTRU 102), a radio access network (RAN) 103/104/105, a core network 106/107/109, a public switched telephone network (PSTN) 108, the Internet 110, and other networks 112, though it will be appreciated that the disclosed embodiments contemplate any number of WTRUs, base stations, networks, and/or network elements.

Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106/107/109, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 103/104/105, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, e.g., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 115/116/117, which may be any suitable wireless communication link (e.g., radio frequency (RF), microwave, infrared (IR), ultraviolet (UV), visible light, etc.). The air interface 115/116/117 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 103/104/105 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 115/116/117 using Long Term Evolution (LTE) and/or LTE-Advanced (LTE-A).

In other embodiments, the base station 114a and the WTRUs 102a, 102b, 102c may implement radio technologies such as IEEE 802.16 (e.g., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 15A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000. GSM, LTE, LTE-A, etc.) to establish a picocell or femtocell. As shown in FIG. 15A, the base station 114b may have a direct connection to the Internet 110. Thus, the base station 114b may not be used to access the Internet 110 via the core network 106/107/109.

The RAN 103/104/105 may be in communication with the core network 106/107/109, which may be any type of network configured to provide voice, data, applications, and/or voice over internet protocol (VoIP) services to one or more of the WTRUs 102a, 102b, 102c, 102d. For example, the core network 106/107/109 may provide call control, billing services, mobile location-based services, pre-paid calling, Internet connectivity, video distribution, etc., and/or perform high-level security functions, such as user authentication. Although not shown in FIG. 15A, it will be appreciated that the RAN 103/104/105 and/or the core network 106/107/109 may be in direct or indirect communication with other RANs that employ the same RAT as the RAN 103/104/105 or a different RAT. For example, in addition to being connected to the RAN 103/104/105, which may be utilizing an E-UTRA radio technology, the core network 106/107/109 may also be in communication with another RAN (not shown) employing a GSM radio technology.

The core network 106/107/109 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 103/104/105 or a different RAT.

One or more of the WTRUs 102a, 102b, 102c, 102d in the communications system 100 may include multi-mode capabilities, e.g., the WTRUs 102a, 102b, 102c, 102d may include multiple transceivers for communicating with different wireless networks over different wireless links. For example, the WTRU 102c shown in FIG. 15A may be configured to communicate with the base station 114a, which may employ a cellular-based radio technology, and with the base station 114b, which may employ an IEEE 802 radio technology.

Figure 15B:
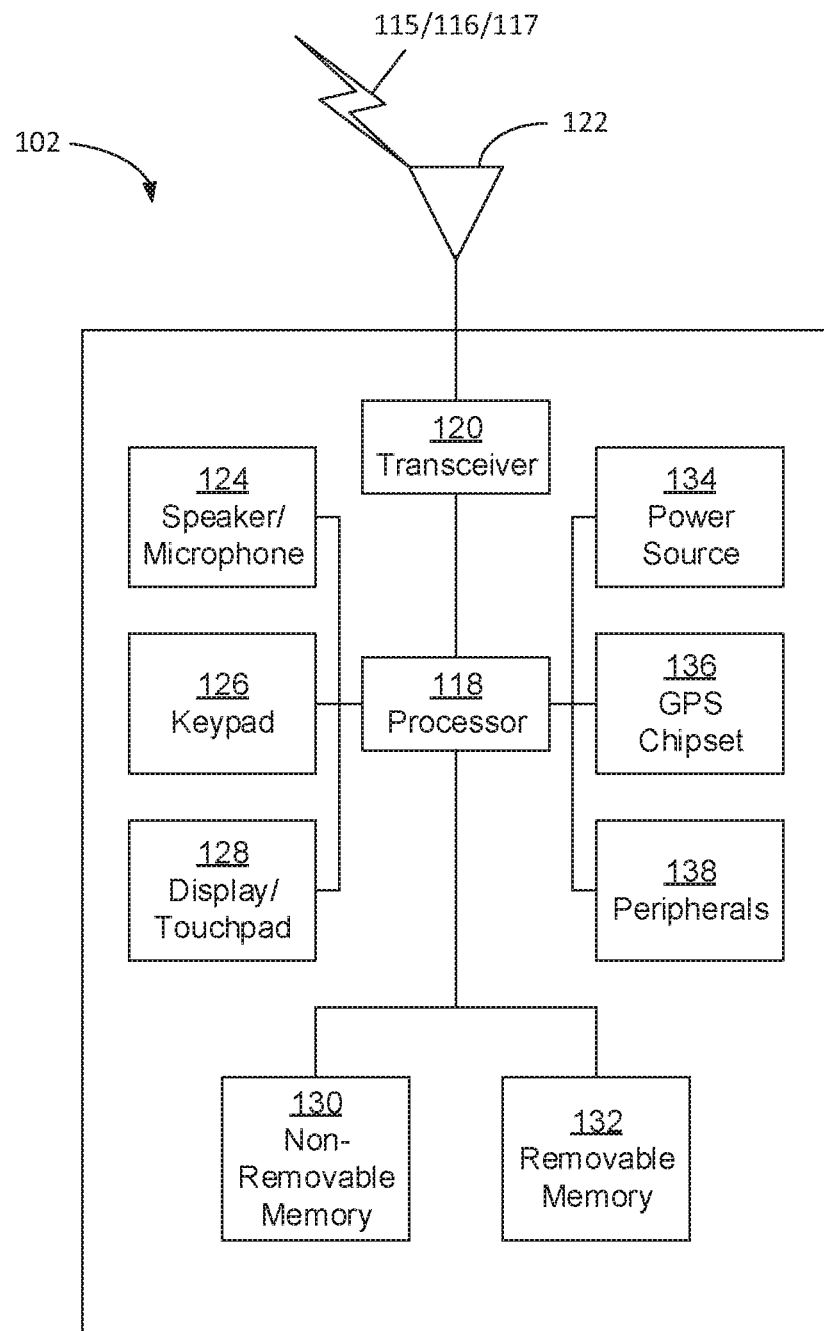
FIG. 15B is a system diagram of an example wireless transmit/receive unit (WTRU) that may be used within the communications system illustrated in FIG. 15A.

FIG. 15B is a system diagram of an example WTRU 102. As shown in FIG. 15B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any sub-combination of the foregoing elements while remaining consistent with an embodiment. Also, embodiments contemplate that the base stations 114a and 114b, and/or the nodes that base stations 114a and 114b may represent, such as but not limited to transceiver station (BTS), a Node-B, a site controller, an access point (AP), a home node-B, an evolved home node-B (eNodeB), a home evolved node-B (HeNB), a home evolved node-B gateway, and proxy nodes, among others, may include one or more of the elements depicted in FIG. 15B and described herein.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 15B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 115/116/117. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 15B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 115/116/117.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 115/116/117 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

Figure 15C:
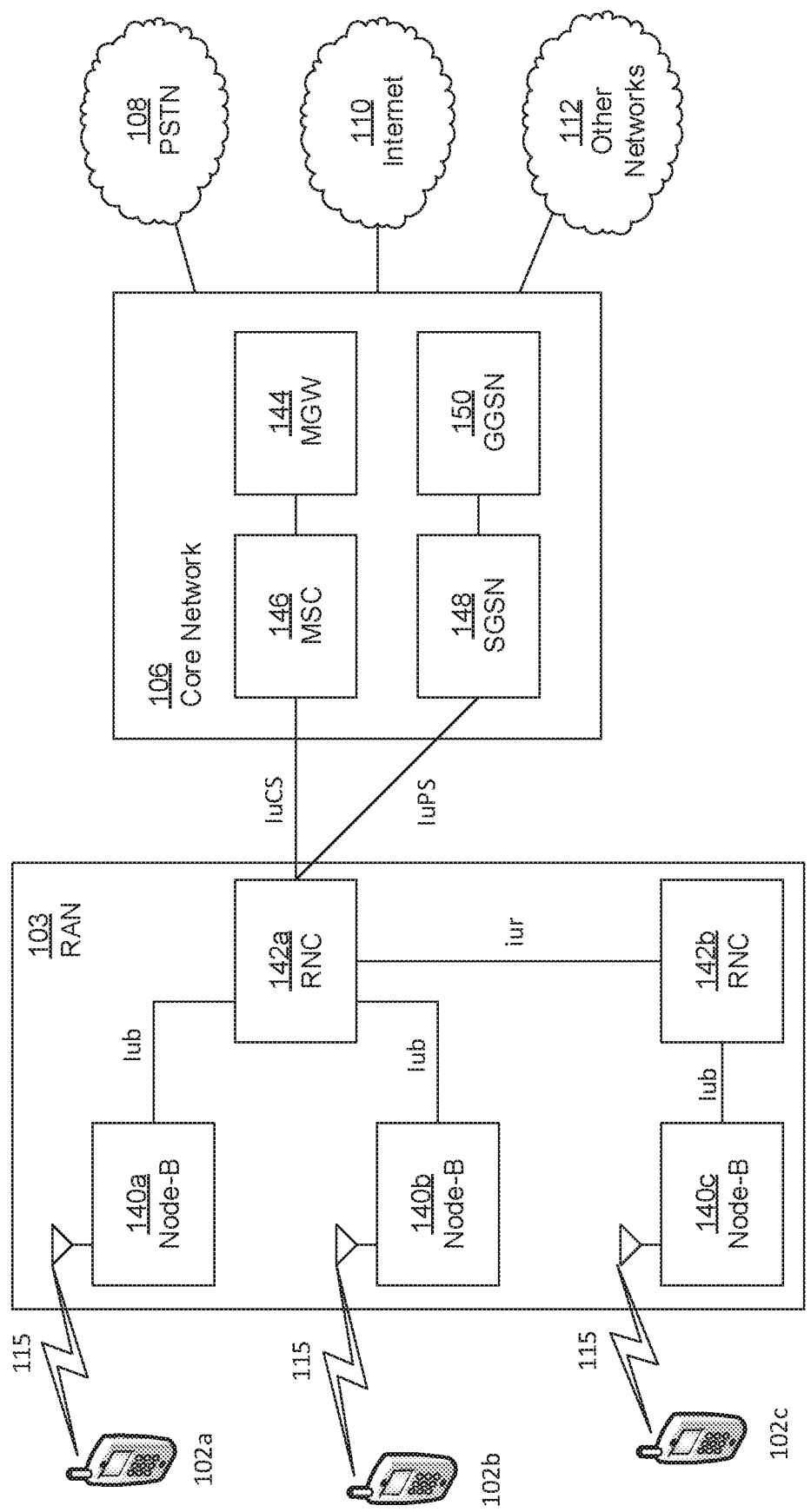
FIG. 15C is a system diagram of an example radio access network and an example core network that may be used within the communications system illustrated in FIG. 15A.

FIG. 15C is a system diagram of the RAN 103 and the core network 106 according to an embodiment. As noted above, the RAN 103 may employ a UTRA radio technology to communicate with the WTRUs 102a, 102b, 102c over the air interface 115. The RAN 103 may also be in communication with the core network 106. As shown in FIG. 15C, the RAN 103 may include Node-Bs 140a, 140b, 140c, which may each include one or more transceivers for communicating with the WTRUs 102a, 102b, 102c over the air interface 115. The Node-Bs 140a, 140b, 140c may each be associated with a particular cell (not shown) within the RAN 103. The RAN 103 may also include RNCs 142a, 142b. It will be appreciated that the RAN 103 may include any number of Node-Bs and RNCs while remaining consistent with an embodiment.

As shown in FIG. 15C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 15C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 103 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and land-line communications devices.

The RNC 142a in the RAN 103 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

Figure 15D:
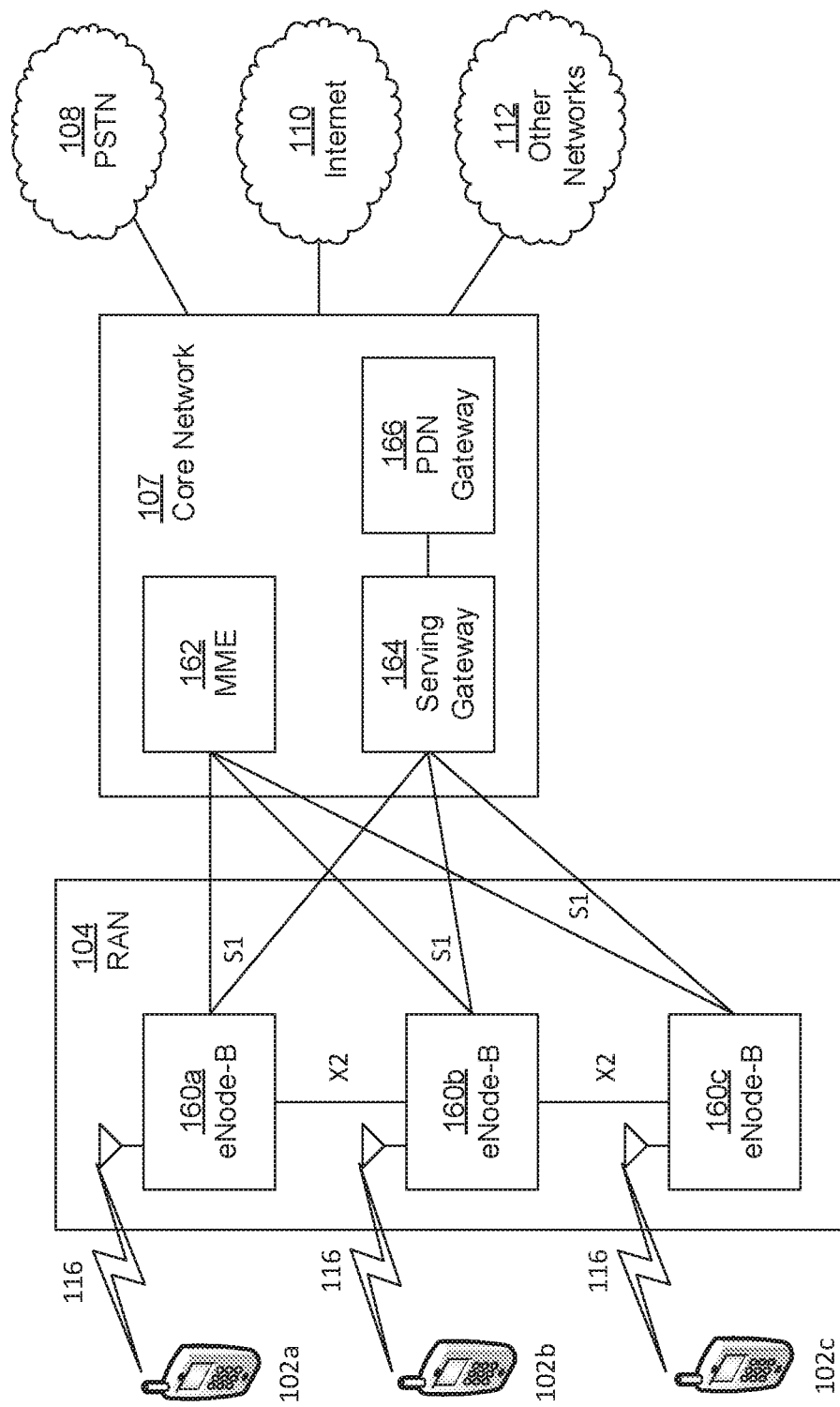
FIG. 15D is a system diagram of another example radio access network and an example core network that may be used within the communications system illustrated in FIG. 15A.

FIG. 15D is a system diagram of the RAN 104 and the core network 107 according to an embodiment. As noted above, the RAN 104 may employ an E-UTRA radio technology to communicate with the WTRUs 102a, 102b, 102c over the air interface 116. The RAN 104 may also be in communication with the core network 107.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and receive wireless signals from, the WTRU 102a.

Each of the eNode-Bs 160a, 160b, 160c may be associated with a particular cell (not shown) and may be configured to handle radio resource management decisions, handover decisions, scheduling of users in the uplink and/or downlink, and the like. As shown in FIG. 15D, the eNode-Bs 160a, 160b, 160c may communicate with one another over an X2 interface.

The core network 107 shown in FIG. 15D may include a mobility management gateway (MME) 162, a serving gateway 164, and a packet data network (PDN) gateway 166. While each of the foregoing elements are depicted as part of the core network 107, it will be appreciated that any one of these elements may be owned and/or operated by an entity other than the core network operator.

The MME 162 may be connected to each of the eNode-Bs 160a, 160b, 160c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may also provide a control plane function for switching between the RAN 104 and other RANs (not shown) that employ other radio technologies, such as GSM or WCDMA.

The serving gateway 164 may be connected to each of the eNode-Bs 160a, 160b, 160c in the RAN 104 via the S1 interface. The serving gateway 164 may generally route and forward user data packets to/from the WTRUs 102a, 102b, 102c. The serving gateway 164 may also perform other functions, such as anchoring user planes during inter-eNode B handovers, triggering paging when downlink data is available for the WTRUs 102a, 102b, 102c, managing and storing contexts of the WTRUs 102a, 102b, 102c, and the like.

The serving gateway 164 may also be connected to the PDN gateway 166, which may provide the WTRUs 102a, 102b, 102c with access to packet-switched networks, such as the Internet 110, to facilitate communications between the WTRUs 102a, 102b, 102c and IP-enabled devices.

The core network 107 may facilitate communications with other networks. For example, the core network 107 may provide the WTRUs 102a, 102b, 102c with access to circuit-switched networks, such as the PSTN 108, to facilitate communications between the WTRUs 102a, 102b, 102c and land-line communications devices. For example, the core network 107 may include, or may communicate with, an IP gateway (e.g., an IP multimedia subsystem (IMS) server) that serves as an interface between the core network 107 and the PSTN 108. In addition, the core network 107 may provide the WTRUs 102a, 102b, 102c with access to the networks 112, which may include other wired or wireless networks that are owned and/or operated by other service providers.

Figure 15E:
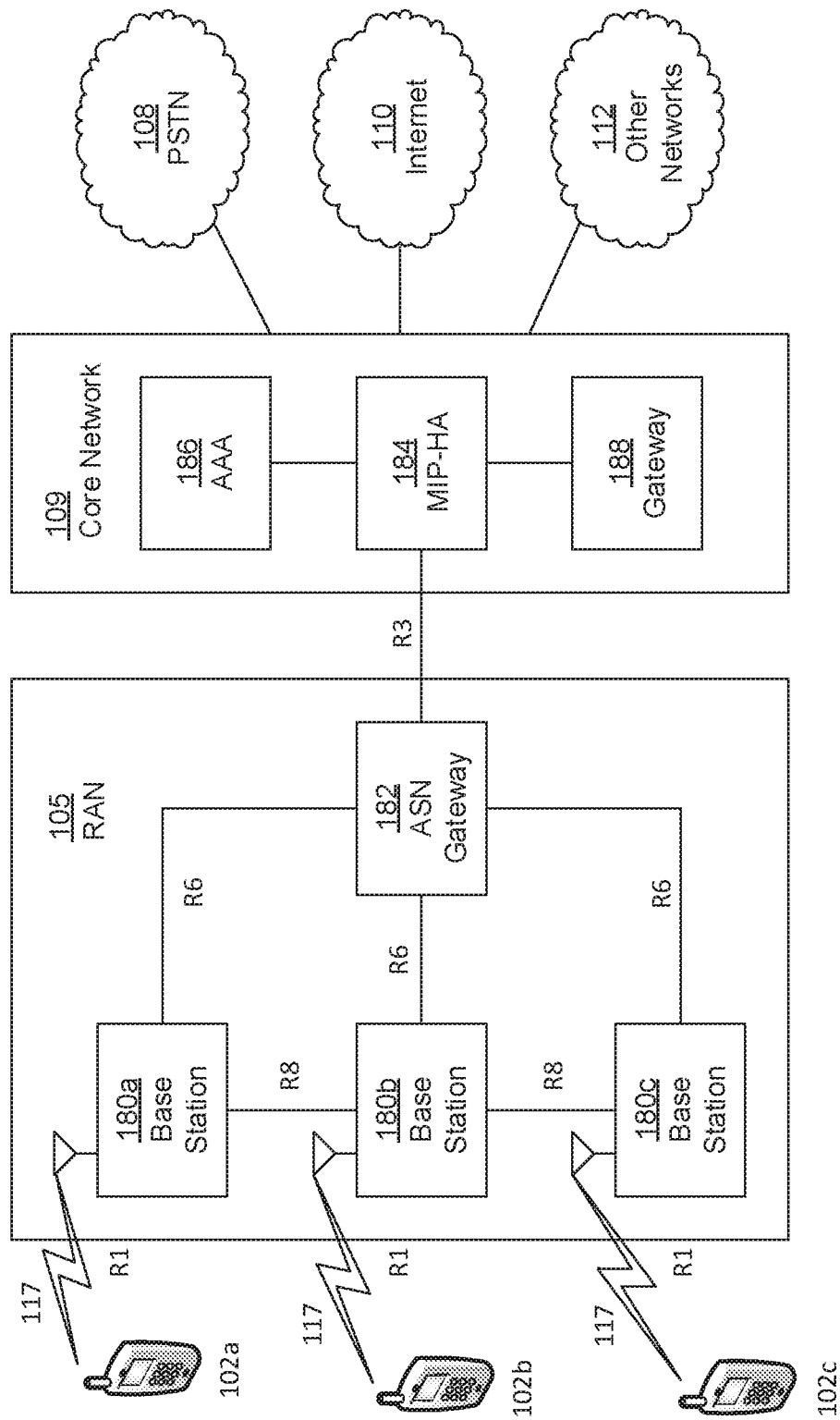
FIG. 15E is a system diagram of another example radio access network and an example core network that may be used within the communications system illustrated in FIG. 15A.

FIG. 15E is a system diagram of the RAN 105 and the core network 109 according to an embodiment. The RAN 105 may be an access service network (ASN) that employs IEEE 802.16 radio technology to communicate with the WTRUs 102a, 102b, 102c over the air interface 117. As will be further discussed below, the communication links between the different functional entities of the WTRUs 102a, 102b, 102c, the RAN 105, and the core network 109 may be defined as reference points.

As shown in FIG. 15E, the RAN 105 may include base stations 180a, 180b, 180c, and an ASN gateway 182, though it will be appreciated that the RAN 105 may include any number of base stations and ASN gateways while remaining consistent with an embodiment. The base stations 180a, 180b, 180c may each be associated with a particular cell (not shown) in the RAN 105 and may each include one or more transceivers for communicating with the WTRUs 102a, 102b, 102c over the air interface 117. In one embodiment, the base stations 180a, 180b, 180c may implement MIMO technology. Thus, the base station 180a, for example, may use multiple antennas to transmit wireless signals to, and receive wireless signals from, the WTRU 102a. The base stations 180a, 180b, 180c may also provide mobility management functions, such as handoff triggering, tunnel establishment, radio resource management, traffic classification, quality of service (QoS) policy enforcement, and the like. The ASN gateway 182 may serve as a traffic aggregation point and may be responsible for paging, caching of subscriber profiles, routing to the core network 109, and the like.

The air interface 117 between the WTRUs 102a, 102b, 102c and the RAN 105 may be defined as an R1 reference point that implements the IEEE 802.16 specification. In addition, each of the WTRUs 102a, 102b, 102c may establish a logical interface (not shown) with the core network 109. The logical interface between the WTRUs 102a, 102b, 102c and the core network 109 may be defined as an R2 reference point, which may be used for authentication, authorization, P host configuration management, and/or mobility management.

The communication link between each of the base stations 180a, 180b, 180c may be defined as an R8 reference point that includes protocols for facilitating WTRU handovers and the transfer of data between base stations. The communication link between the base stations 180a, 180b, 180c and the ASN gateway 182 may be defined as an R6 reference point. The R6 reference point may include protocols for facilitating mobility management based on mobility events associated with each of the WTRUs 102a, 102b, 102c.

As shown in FIG. 15E, the RAN 105 may be connected to the core network 109. The communication link between the RAN 105 and the core network 109 may defined as an R3 reference point that includes protocols for facilitating data transfer and mobility management capabilities, for example. The core network 109 may include a mobile IP home agent (MIP-HA) 184, an authentication, authorization, accounting (AAA) server 186, and a gateway 188. While each of the foregoing elements are depicted as part of the core network 109, it will be appreciated that any one of these elements may be owned and/or operated by an entity other than the core network operator.

The MIP-HA may be responsible for IP address management, and may enable the WTRUs 102a, 102b, 102c to roam between different ASNs and/or different core networks. The MIP-HA 184 may provide the WTRUs 102a, 102b, 102c with access to packet-switched networks, such as the Internet 110, to facilitate communications between the WTRUs 102a, 102b, 102c and IP-enabled devices. The AAA server 186 may be responsible for user authentication and for supporting user services. The gateway 188 may facilitate interworking with other networks. For example, the gateway 188 may provide the WTRUs 102a, 102b, 102c with access to circuit-switched networks, such as the PSTN 108, to facilitate communications between the WTRUs 102a, 102b, 102c and land-line communications devices. In addition, the gateway 188 may provide the WTRUs 102a, 102b, 102c with access to the networks 112, which may include other wired or wireless networks that are owned and/or operated by other service providers.

Although not shown in FIG. 15E, it will be appreciated that the RAN 105 may be connected to other ASNs and the core network 109 may be connected to other core networks. The communication link between the RAN 105 the other ASNs may be defined as an R4 reference point, which may include protocols for coordinating the mobility of the WTRUs 102a, 102b, 102c between the RAN 105 and the other ASNs. The communication link between the core network 109 and the other core networks may be defined as an R5 reference, which may include protocols for facilitating interworking between home core networks and visited core networks.

Systems, methods, and instrumentalities have been disclosed for enhanced chroma coding using cross plane filtering. A reference, predicted and/or reconstructed chroma sample may be enhanced, for example, using information derived from cross plane filtering of a 1-D or 2-D M×N window of luma samples (a filter support region) corresponding to the reference, predicted or reconstructed chroma sample, respectively. Luma samples may be reconstructed or padded. A filter support region may be adaptively selected, for example, based on a directional intra prediction mode. Cross plane filters may be classified, e.g., for applicability, and may be adaptively selected, for example, based on a filter support region, whether intra or inter prediction mode is used for a current block, whether integer or fractional pixel motion vectors are used and/or whether a reference picture is used in inter prediction. Signaling may be provided to a decoder, for example, to indicate at least one of: whether chroma enhancement is enabled, whether chroma enhancement is applied to a current block, a cross plane filter type, a cross plane filter (e.g. set of filters) and corresponding cross plane filter coefficients. A decoder may select a cross plane filter to apply to a filter support region based on received signaling.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:
1. A method of video processing, the method comprising:
 obtaining a plurality of chroma reference samples used to predict a video block, wherein a current picture comprises the video block;
 determining a luma sample region in the current picture for enhancing a corresponding chroma sample, wherein the corresponding chroma sample is in the plurality of chroma reference samples, wherein the luma sample region encompasses at least one of an available luma sample and an unavailable luma sample, and wherein the available luma sample is a reconstructed luma sample;
 applying a cross-plane filter to the luma sample region to determine an offset, wherein the cross-plane filter is applied to the luma sample region encompassing the unavailable luma sample, wherein the unavailable luma sample is obtained based on the available luma sample prior to reconstruction of the unavailable luma sample;

applying the offset to the corresponding chroma sample to determine an enhanced chroma sample; and predicting the video block using the enhanced chroma sample.

2. The method of claim 1, wherein the unavailable luma sample is obtained based on replacing the unavailable luma sample with padding a neighboring available luma sample prior to applying the cross-plane filter to the luma sample region, and the neighboring available luma sample is the reconstructed luma sample.

3. The method of claim 1, further comprising determining whether to apply the cross-plane filter based on a chroma enhancement indicator, wherein the chroma enhancement indicator is obtained at a block level.

4. The method of claim 1, wherein the plurality of chroma reference samples is a first plurality of chroma reference samples, the luma sample region is a first luma sample region, the available luma sample is a first available luma sample, the unavailable luma sample is a first unavailable luma sample, the reconstructed luma sample is a first reconstructed luma sample, the offset is a first offset, the corresponding chroma sample is a first corresponding chroma sample, and the enhanced chroma sample is a first enhanced chroma sample, the method further comprising:

determining a second luma sample region in the current picture for enhancing a second corresponding chroma sample, wherein the second corresponding chroma sample is in a second plurality of chroma reference samples, wherein the second luma sample region encompasses at least one of a second available luma sample and a second unavailable luma sample, and wherein the second available luma sample is a second reconstructed luma sample;

applying the cross-plane filter to the second luma sample region to determine a second offset, wherein the cross-plane filter is applied to the second luma sample region encompassing the second unavailable luma sample, wherein the second unavailable luma sample is obtained based on the second available luma sample prior to the reconstruction of the second unavailable luma sample;

applying the second offset to the second corresponding chroma sample to determine a second enhanced chroma sample; and predicting the video block using the second enhanced chroma sample.

5. The method of claim 1, wherein the luma sample region is determined based on at least one of a selected intra prediction mode or a selected inter prediction mode.

6. The method of claim 1, further comprising determining the cross-plane filter to apply based on at least one of a selected intra prediction mode or a selected inter prediction mode.

7. The method of claim 1, wherein the corresponding chroma sample is a predicted chroma sample in the video block.

8. The method of claim 1, wherein the corresponding chroma sample is a reconstructed chroma sample before in-loop filtering, and the enhanced chroma sample is used to replace the corresponding chroma sample before the in-loop filtering is applied.

9. The method of claim 1, wherein the corresponding chroma sample is a reference chroma sample used to predict one or more samples in the video block.

10. A video processing coding device comprising:

a processor configured to:

obtain a plurality of chroma reference samples used to predict a video block, wherein a current picture comprises the video block;

determine a luma sample region in the current picture for enhancing a corresponding chroma sample, wherein the corresponding chroma sample is associated with in the plurality of chroma reference samples, wherein the luma sample region encompasses at least one of an available luma sample and an unavailable luma sample, and wherein the available luma sample is a reconstructed luma sample;

apply a cross-plane filter to the luma sample region to determine an offset, wherein the cross-plane filter is applied to the luma sample region encompassing the unavailable luma sample, wherein the unavailable luma sample is obtained based on the available luma sample prior to reconstruction of the unavailable luma sample;

apply the offset to the corresponding chroma sample to determine an enhanced chroma sample; and predict the video block using the enhanced chroma sample.

11. The video processing device of claim 10, wherein the unavailable luma sample is obtained based on replacing the unavailable luma sample with padding a neighboring available luma sample prior to applying the cross-plane filter to the luma sample region, and the neighboring available luma sample is the reconstructed luma sample.

12. The video processing device of claim 10, wherein the processor is further configured to determine whether to apply the cross-plane filter based on a chroma enhancement indicator, wherein the chroma enhancement indicator is obtained at a block level.

13. The video processing device of claim 10, wherein the plurality of chroma reference samples is a first plurality of chroma reference samples, the luma sample region is a first luma sample region, the available luma sample is a first available luma sample, the unavailable luma sample is a first unavailable luma sample, the reconstructed luma sample is a first reconstructed luma sample, the offset is a first offset, the corresponding chroma sample is a first corresponding chroma sample, and the enhanced chroma sample is a first enhanced chroma sample, the processor further configured to:

determine a second luma sample region in the current picture for enhancing a second corresponding chroma sample, wherein the second corresponding chroma sample is in a second plurality of chroma reference samples, wherein the second luma sample region encompasses at least one of a second available luma sample and a second unavailable luma sample, and wherein the second available luma sample is a second reconstructed luma sample;

apply the cross-plane filter to the second luma sample region to determine a second offset, wherein the cross-plane filter is applied to the second luma sample region encompassing the second unavailable luma sample, wherein the second unavailable luma sample is obtained based on the second available luma sample prior to the reconstruction of the second unavailable luma sample;

apply the second offset to the second corresponding chroma sample to determine a second enhanced chroma sample; and predicting the video block using the second enhanced chroma sample.

14. The video processing device of claim 10, wherein the processor is further configured to:

determine the cross-plane filter to apply based on at least one of a selected intra prediction mode or a selected inter prediction mode, and determine the luma sample region based on the at least one of the selected intra prediction mode or the selected inter prediction mode.

15. The video processing device of claim 10, wherein the corresponding chroma sample is a predicted chroma sample in the video block.

16. The video processing device of claim 10, wherein the corresponding chroma sample is a reconstructed chroma sample before in-loop filtering, and the enhanced chroma sample is used to replace the corresponding chroma sample before the in-loop filtering is applied.

17. The video processing device of claim 10, wherein the corresponding chroma sample is a reference chroma sample used to predict one or more chroma samples in the video block.

18. The method of claim 1, wherein the method comprises: obtaining an indication of the cross-plane filtr that is associated with the current picture.

19. The video processing device of claim 10, wherein the processor is configured to:

obtain an indication of the cross-plane filter that is associated with the current picture, wherein the obtained indication comprises one or more filter coefficients associated with the cross-plane filter.

20. The video processing device of claim 10, wherein the video processing device is a video decoding device.

21. The video processing device of claim 10, wherein the video processing device is a video encoding device.

22. The method of claim 18, wherein the obtained indication comprises one or more filter coefficients associated with the cross-plane filter.

* * * * *